(12) United States Patent
Binder

(10) Patent No.: US 12,068,803 B2
(45) Date of Patent: Aug. 20, 2024

(54) TIME DOMAIN SEPARATED POWERLINE COMMUNICATIONS METHOD FOR INPUT SOURCE SELECTION

(71) Applicant: MICROSOFT TECHNOLOGY LICENSING, LLC, Redmond, WA (US)

(72) Inventor: Julian Arlo Binder, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 18/147,485

(22) Filed: Dec. 28, 2022

(65) Prior Publication Data

US 2024/0223238 A1    Jul. 4, 2024

(51) Int. Cl.
  *H04B 3/00* (2006.01)
  *H02J 7/00* (2006.01)
  (Continued)

(52) U.S. Cl.
  CPC .......... *H04B 3/54* (2013.01); *H02J 7/007182* (2020.01); *H02J 13/00002* (2020.01); *H02J 13/00007* (2020.01)

(58) Field of Classification Search
  CPC ............................ H04B 3/54; H02J 7/007182; H02J 13/00002; H02J 13/00007
  (Continued)

(56) References Cited

U.S. PATENT DOCUMENTS 8,783,861 B2    7/2014  Blum et al.
8,801,174 B2    8/2014  Willey
(Continued)

FOREIGN PATENT DOCUMENTS

CN        1138768 A     12/1996
CN     209046286 U      6/2019

OTHER PUBLICATIONS

"Notice of Allowance Issued in U.S. Appl. No. 17/362,930", Mailed Date: May 23, 2022, 10 Pages.
(Continued)

*Primary Examiner* — Zewdu A Kassa
(74) *Attorney, Agent, or Firm* — Scott Y. Shigeta; Newport IP, LLC

(57) ABSTRACT

Technologies are described for a two-wire power delivery system with negotiated charging between host and client devices. The host device uses a state machine and additional support circuits to negotiate time-domain separated bi-directional communications with a client device over powerlines with a two-wire cable. After attachment of the client device is detected by the host device, communications are sent from the host device to the client device, an acknowledgement is sent by the client device to the host device, and charging by the host device is established. Additional failsafe conditions may be detected by the host device, such as: detachment of the client device, short circuits, and dead batteries. Periodic retriggering of negotiated communications is utilized to ensure safe charging operation and failsafe conditions. The client device includes a correspondingly configured state machine with support circuitry to facilitate communications and proper detection of conditions by the host device.

20 Claims, 8 Drawing Sheets

(51) Int. Cl.
  *H02J 13/00* (2006.01)
  *H04B 3/54* (2006.01)
(58) Field of Classification Search
  USPC .............................. 375/257, 219, 295, 316
  See application file for complete search history.

(56) References Cited

U.S. PATENT DOCUMENTS

| | | | |
|---|---|---|---|
| 9,640,921 | B2 | 5/2017 | Choi |
| 10,261,162 | B2 | 4/2019 | Bucknor et al. |
| 2010/0284275 | A1 | 11/2010 | Martinez |
| 2011/0148660 | A1 | 6/2011 | Tate |
| 2012/0001740 | A1 | 1/2012 | Doi et al. |
| 2013/0015824 | A1 | 1/2013 | Newton |
| 2014/0194160 | A1* | 7/2014 | Jing ............... H04B 1/3883 455/557 |
| 2016/0358722 | A1 | 12/2016 | Lakshmanan |
| 2018/0286609 | A1 | 10/2018 | Chang et al. |
| 2018/0351359 | A1 | 12/2018 | Abe |
| 2020/0014163 | A1 | 1/2020 | Kwon et al. |
| 2020/0201042 | A1 | 6/2020 | Wang et al. |

OTHER PUBLICATIONS

"International Search Report and Written Opinion Issued in PCT Application No. PCT/US22/029720", Mailed Date: Sep. 1, 2022, 11 Pages.

Pino, Nick, "Bose Frames Combine Headphones, Sunglasses and . . . Augmented Reality?", Retrieved from: https://www.techradar.com/in/news/bose-frames-combine-headphones-sunglasses-and-augmented-reality, Dec. 5, 2018, 11 Pages.

International Search Report and Written Opinion received for PCT Application No. PCT/US23/036065, mailed on Feb. 12, 2024, 13 pages.

* cited by examiner

TIME DOMAIN SEPARATED POWERLINE COMMUNICATIONS METHOD FOR INPUT SOURCE SELECTION

BACKGROUND

Many developments have been made to improve the way batteries are used in mobile electronic devices. For instance, some charging circuits have been developed to enable a single battery charger to supply power for device operation while also providing an independent power source to charge the device batteries. Although there have been some improvements with respect to such circuits, there are many shortcomings and inefficiencies with respect to current technologies. For example, some current charging circuits are quite bulky and heavy. Additionally, special connectors are often required that are keyed to ensure proper orientation of the connector when connected to the mobile device. Such designs have poor consumer appeal and would benefit from an improved design.

Universal Serial Bus (USB) devices have evolved from a data interface capable with limited power capabilities to a primary provider of power to devices with a data interface. Today many devices are charged or receive power from USB ports contained in laptops, workstations, docking stations, displays, cars, airplanes or even wall sockets. Extensions to basic USB functionality are also outlined in the USB Power Delivery (USB PD) Specification, which provides a detailed functional framework for USB ports to provide a more flexible power delivery mechanism for power and data over a single cable.

The disclosure made herein is presented with respect to these and other considerations.

SUMMARY

Technologies are described for a two-wire power delivery system with negotiated charging between host and client devices. The host device uses a state machine and additional support circuits to negotiate time-domain separated bi-directional communications with a client device over powerlines with a two-wire cable. After attachment of the client device is detected by the host device, communications are established with the client device, an acknowledgement is received by the host device, and charging is established. Additional failsafe conditions may be identified by the host device, such as: detachment from the client device, short circuit conditions, and dead battery conditions. Periodic retriggering of negotiated communications can be utilized to ensure safe charging operation and failsafe conditions. The client device includes a correspondingly configured state machine with support circuitry to facilitate communications and proper detection of conditions between the host and client devices.

In some examples, a method for a host device to communicate with a client device over a powerline with a two-wire cable is described, the methods for the host device comprising: initializing the host device to operate in a first state; in a first state, disabling host device charging and communication circuits, operating a first timer, and transitioning to a second state after the first timer expires; in the second state, operating a second timer while monitoring a status of the two-wire cable, transitioning to a third state when the second timer has not expired and a status of the two-wire cable is detected as attached, and transitioning to the first state when the second timer has expired; in the third state, enabling host device communication circuits to send a first message to the two-wire cable, and transitioning to a fourth state after the transmission of the first message is complete; in the fourth state, enabling host device communication circuits to receive a second message from the two-wire cable, transitioning to a fifth state when the second message received indicates success, and transitioning to the first state when the second message received indicates failure; and in a fifth state, enabling host device charging circuits to couple power to the two-wire cable while monitoring the status of the two-wire cable, and transitioning to the first state when either charging is complete or the status of the two-wire cable is detached.

In some additional examples, a host device configured to communicate with a client device to negotiate charging from an external power source over a two-wire cable is described, the host device comprising: a load switch circuit that selectively couples power from a power source at a first node to a switched power node responsive to a power enable signal; host support circuits, including: a charge sense circuit that is coupled between the switched power node and a second node, wherein the second node corresponds to a terminal of the two-wire cable; an attachment test circuit that selectively couples a first resistance to the switched power node responsive a detection enable signal; a communication enable circuit that selectively couples a second resistance to the switched power node responsive a communication enable signal; a transmitter circuit that selectively couples modulated data to the switched power node responsive a data transmit signal; a receiver circuit that selectively receives modulated data from the second node to generate a data receive signal; and a host control circuit that is configured to selectively operate the load switch circuit and the host support circuits to negotiate detection, attachment, communications, and charging of the client device with time-domain separated bi-directional communications.

In yet other examples, a method for a client device to communicate with a host device over a powerline with a two-wire cable is described, the method for the client device comprising: coupling a battery test circuit to a terminal of the two-wire cable; initializing the client device to operate in a first state; in the first state, activating a communication enable circuit and monitoring a voltage of the two-wire cable, transitioning to a second state when the voltage of the two-wire cable is detected as active; in the second state, enabling client device communication circuits to receive a first message from the two-wire cable, transitioning to a third state after the first message is received; in the third state, enabling client device communication circuits to transmit a second message to the two-wire cable, transitioning to a fourth state when the second message is transmitted and the voltage of the two-wire cable is detected as active, and transitioning to the first state when the voltage of the two-wire cable is detected as inactive; and in the fourth state, deactivating the communication enable circuit, charging a battery of the client device with power delivered from the two-wire cable while the voltage of the two-wire cable is detected as active, and transitioning to the first state when the voltage of the two-wire cable is detected as inactive.

In still other examples, a client device that negotiates charging of a battery of the client device from a host device with an external power source over a two-wire cable is described, the client device comprising: a charger circuit that is coupled between a battery and a terminal for the two-wire cable; and client support circuits, including: a battery test circuit that couples a first resistance to the terminal; a communication enable circuit that selectively couples a second resistance to the terminal responsive a communication enable signal; a transmitter circuit that selectively couples modulated signals to the terminal responsive a data transmit signal; a receiver circuit that selectively receives modulated signals from the terminal to generate a data receive signal; and a client control circuit that is configured to selectively operate the charger circuit and the client support circuits to negotiate attachment, communications, and charging of the battery of the client device with time-domain separation between communications and charging.

It should be appreciated that the above-described subject matter may also be implemented as part of an apparatus, system, or as part of an article of manufacture. These and various other features will be apparent from a reading of the following Detailed Description and a review of the associated drawings.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
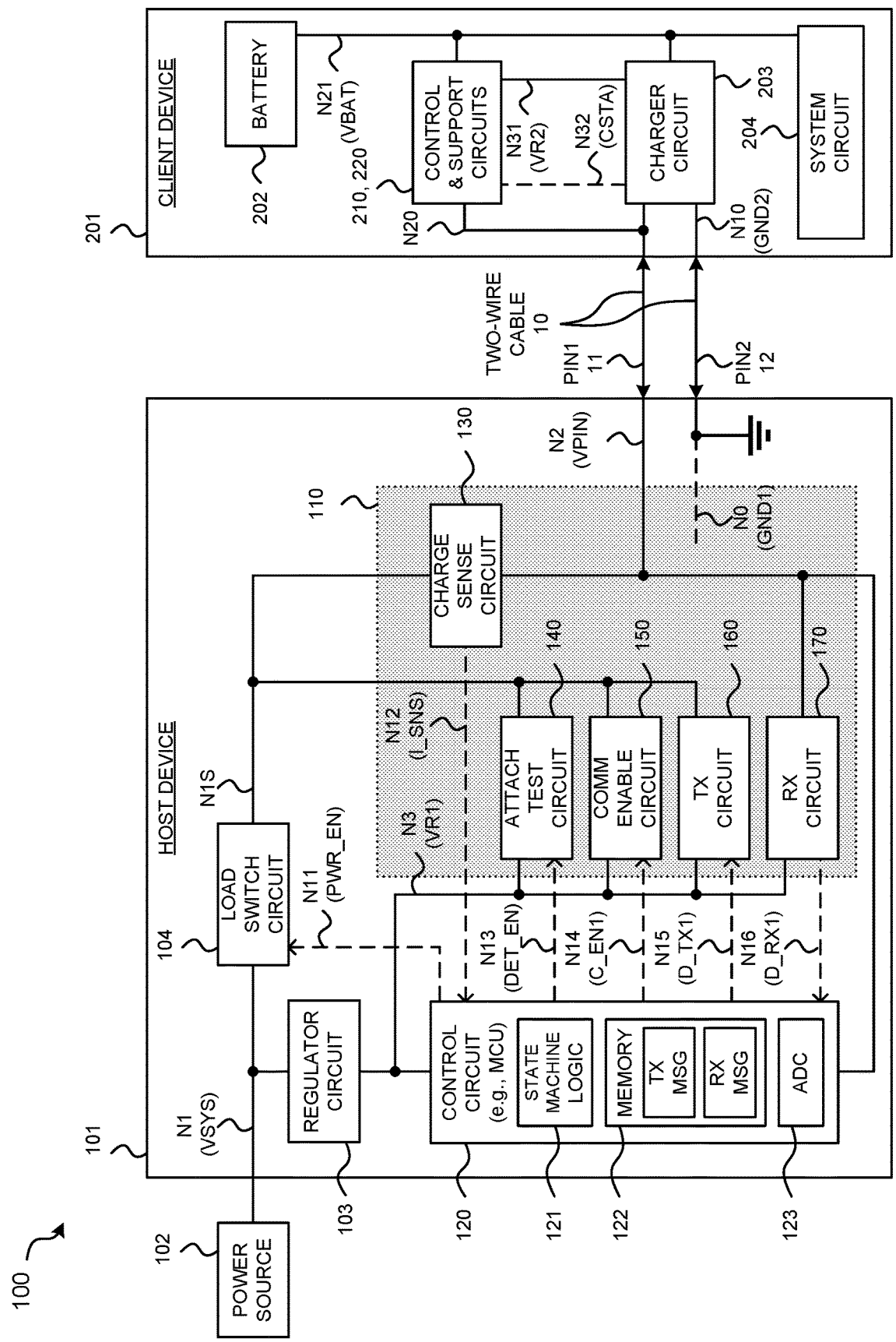
FIG. 1 shows a schematic diagram of an example power delivery and communication system.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a power, current, voltage, data, electric wave, magnetic wave, electromagnetic wave, or optical signal. Based upon context, the term "coupled" may refer to a wave or field coupling effect, which may relate to a corresponding optical field, magnetic field, electrical field, or a combined electromagnetic field.

Mobile devices, such as cell phones, handheld gaming devices, smart watches, headphones and headsets often include rechargeable batteries. Cables and connectors for these mobile devices often may be used for many purposes, for example: to recharge the batteries, to allow device use when the battery charge is too low, and/or to transfer data into or out of the mobile device. Consequently, many mobile devices use power connector and cabling interfaces that are manufactured according to industry standards.

The Universal Serial Bus (USB) is an industry standard that establishes specifications for cables and connectors and the various protocols for connecting power and data. The USB standard has changed over time, and there now exists multiple versions of the standard (USB 1.0, USB 2.0, USB 3.0, USB 3.1, etc.). The evolution of the standard has led to increased data transmission speeds, as well as support for a variety of different connector styles. The USB Power Delivery (USB PD) Specification enables the maximum functionality of USB by providing more flexible power delivery along with data over a single cable.

The aim of USB PD is to operate with and build on the existing USB ecosystem. Existing mobile devices that negotiate voltage/current mostly utilize USB PD, or similar protocols, to arrive on a contract. These existing protocols require an additional communication pin (CC in the case of USB PD); and usually require additional complex and area consuming components, which leads to increased expense compared to the present solution.

Although there are now many different styles of connectors that are now supported in the USB standard, the connectors are still fairly large size since they support both power and data communications. Moreover, data communication cable designs tend to require certain considerations to minimize signal crosstalk and radio frequency (RF) interference, which results in special designs that may be bulky and expensive. Consequently, the design of power cables using these standardized cables and connectors may not be ideal in all applications.

Technologies are described for a two-wire power delivery system with negotiated charging between host and client devices. The host device uses a state machine and additional support circuits to negotiate time-domain separated bi-directional communications with a client device over power-lines with a two-wire cable. After attachment of the client device is detected by the host device, communications are sent from the host device to the client device, an acknowledgement is sent by the client device to the host device, and charging by the host device is established. Additional fail-safe conditions may be detected by the host device, such as: detachment of the client device, short circuits, and dead batteries. Periodic retriggering of negotiated communications is utilized to ensure safe charging operation and failsafe conditions. The client device includes a correspondingly configured state machine with support circuitry to facilitate communications and proper detection of conditions by the host device.

The present disclosure contemplates the novel techniques may be implemented as one or more devices, circuits, systems, and methods, which enable bi-directional power-line communications between a host device and a client device. Such communications may be used to negotiate charging voltage or current, and deliver power to the client device. A state machine topology may be employed by the host and client devices to facilitate negotiated operation in various modes or states. Detection and negation of various conditions are contemplated, including but not limited to detection of a connection status of the client device as attached, detached, short circuit, or dead battery conditions. The negotiation between the host and client devices is accomplished by time-domain separated communication over two-wire cables, where the same power cables that are used for charging are also used for bi-directional communications. As will become apparent, communications are triggered and/or re-trigged based on the detected operating conditions between the devices.

Various benefits are achieved by employing the novel techniques described herein. Some example benefits include, reduced cost of manufacture and ease of product development by employing a two-wire system. The pins or wires of the described systems may simply correspond to power and ground wires that are used for charging, which thus eliminates the need or a special three or four wire cable, and eliminates the need for additional pins to connect to the cable. Smaller form factor, improved aesthetics, and lower costs are achieved by eliminating the need of additional pins and/or wires. One additional technical advantages for the presently disclosed technologies is that the described two-wire charging (e.g., power and ground) and communication methods do not require any large circuitry components, such as inductors that are often required in conventional two-wire solutions, which results in a lower cost solution with ease of manufacturing.

Further benefits may be achieved by the described techniques, where the state machine that is part of the circuit is capable of detecting dead battery and short circuit conditions, charger insertion and removal, where the present methods may employ periodic re-negotiation or retriggering of communications to ensure safe charging. Improved safety may thus be achieved. Additionally, communication may be negotiated to achieve adaptive current charging levels, where faster charging times is achieved by negotiating a high charger current once a solid connection is established and detected by communication, and a lower current level may be achieved (e.g., trickle charge) when needed for certain conditions.

The disclosure made herein is presented with respect to these and other considerations.

FIG. 1 shows a schematic diagram of an example power delivery and communication system 100, arranged in accordance with aspects of the present disclosure.

The example system 100 includes a host device 101 and a client device 201. Host device 101 includes a load regulator circuit 103, a load switch circuit 104, a host control circuit 120, and additional host support circuits 110. The host control circuit 120 is configured to selectively operate the load switch circuit 104 and the host support circuits 110 to negotiate detection, attachment, communications, and charging of the client device 201 with time-domain separated bi-directional communications. An external power source 102 may be arranged to deliver power to the host device 101, which in turn delivers charging power and communicates with the client device 201 via a two-wire cable 10.

The client device 201 includes a battery 202, a charger circuit 203, a system circuit 204, a client control circuit 220, and additional client support circuits 210. The client control circuit 220 is configured to selectively operate the client support circuits 210 to negotiate attachment, communications with the host device 101 by time-domain separated communications, and charging of the battery 202.

Battery 202 may be any type of rechargeable battery (e.g., Lithium Ion polymer, Nickel-Metal Hydride, Etc.), that may be utilized to power various circuits in the client device, either through direct or indirect connections. For example, system circuit 204 of client device 201 may be powered by battery 202. The battery 202 may further include one or more individual batteries or cells, which may be arranged in either series or parallel configurations, which may collectively be referred to as battery 202.

When power is coupled to the client device 201 from the two-wire cable (10), power is delivered to various circuits, including one or more of the charger circuit 203, the client control circuits 210, the client support circuits 229, and/or the system circuit 204. The client device 201 may be any variety of portable electronic device that may benefit from a two-wire power deliver system, including but not limited to a head mounted display, a gaming device, a virtual reality headset, etc.

The load switch circuit 104 is designed to selectively couple power from the power source 102 at a first node N1 to a switched power node N1S in response to a power enable signal PWR_EN, which may be provided by the host control circuit 120. The power enable signal PWR_EN may correspond to a control signal, which may have a digital or analog value, and may correspond to any required number of individual control signals depending on the implementation. In some examples, additional logic, control or switching circuits may be employed inside the load switch circuit 104.

The regulator circuit 103 is coupled to the first node (N1), which corresponds to a system voltage (VSYS), and responsively generates a regulated supply voltage (VR1) at a third node. The regulator circuit may provide the regulated supply voltage (VR1) to a number of other circuits including but not limited to the host control circuit 120 and the host support circuits 110. The regulator circuit 103 may correspond to any form of regulator circuit, with a single or multiple supply outputs, and may thus include one or more linear or switching regulators.

The host support circuits 110 may include a variety of individual circuits or functions, including, but not limited to a charge sense circuit 130, an attachment test circuit 140, a communication enable circuit 150, a transmitter circuit 160, and a receiver circuit 170. These functional partitions of the host support circuits 110 are for illustrative purposes, and may be implemented in a different manner to achieve a similar or equivalent operation. It is thus contemplated that in some implementations the host support circuits 110 may be combined into fewer functional partitions, or separated into additional functional partitions to achieve a similar or equivalent operation.

The charge sense circuit 130 is coupled between the switched power node N1S and a second node N2, and is configured to generate a sense signal (e.g., I_SNS) at node N12. The second node N2 corresponds to a terminal PIN1 of the host device 101 that attaches to a two-wire cable 10. The sense signal indicates an amount of current flowing from the host device 101 to the client device 201. As will be described later, the sense signal may be used by various circuits in the system to monitor and/or adjust a rate of charge delivered to the client device 201.

The attachment test circuit 140 is coupled between the switched power node N1S and the third node N3, and is responsive to a detection enable signal DET_EN at node N13. In various examples, the attachment test circuit 140 selectively couples a first resistance to the switched power node N1S responsive the detection enable signal DET_EN. In some examples, the first resistance is a pull-up resistor coupled between node N1S and a high-side reference voltage (e.g., VDD, VH, etc.). In some other examples, the first resistance is a pull-down resistor coupled between node N1S and a low-side reference voltage (e.g., VSS, VL, GND, etc.). As will be described later, the first resistance may be used by various circuits in the system to aid in determining the attachment status of the host device 101 and the client device 201.

The communication enable circuit 150 is coupled between the switched power node N1S and the third node N3, and is responsive to a communication enable signal C_EN1 at node N14. In various examples, the communication enable circuit 150 selectively couples a second resistance to the switched power node N1S responsive the commination enable signal C_EN1. In some examples, the second resistance is a pull-up resistor coupled between node N1S and a high-side reference voltage (e.g., VDD, VH, etc.). In some other examples, the second resistance is a pull-down resistor coupled between node N1S and a low-side reference voltage (e.g., VSS, VL, GND, etc.). As will be described later, the second resistance may be used by various circuits in the system to aid in communications between the host device 101 and the client device 201.

The transmitter circuit 160 is coupled between the switched power node N1S and the third node N3, and is responsive to a data transmit signal D_TX1 at node N15. In various examples, the transmitter circuit 150 selectively couples a small resistance value to the switched power node N1S responsive the data transmit signal D_TX1. The timing and speed of the selectively coupling of the transmitter circuit 160 is effective to modulate a data pattern for a multi-bit transmission responsive to the data transmit signal D_TX1. In some examples, the small resistance value is a pull-up resistor that is selectively coupled between node N1S and a high-side reference voltage (e.g., VDD, VH, etc.) according to a data pattern, where another resistance is coupled between node N1S and a ground terminal. In some other examples, the small resistance is a pull-down resistor that is selectively coupled between node N1S and a low-side reference voltage (e.g., VSS, VL, GND, etc.) according to the data pattern, where another resistance is coupled between node N1S and a high-side supply. The selective coupling of the small resistance value resistance may thus be used to aid in modulated signals for transmissions between the host device 101 and the client device 201.

The receiver circuit 170 is coupled between node N2 and node N3, and configured to receive modulated signals from the second node N2 to generate a data receive signal D_RX1 at node N16. Example receiver operation will be described further below.

Host control circuit 120 includes several internal functions, which can broadly be described as attachment detection, detachment detection, short-circuit detection, dead battery detection, data transmission, data reception, and charger switch control. These functions may be provided by individual circuits, analog and/or digital, or combined into operation of a single circuit. Additionally, these functions are coordinated by operation of the host control circuit 120, by asserting, de-asserting, or adjusting various control signal such as one or more of the power enable signal PWR_EN at node N11, the detection enable signal DET_EN at node N13, the communication enable signal C_EN1 at node N14, the data transmission signal D_TX1 at node N15, the data receive signal D_RX1 at node N16, and/or the current sense signal I_SNS at node N12.

In some examples, the functions of the host control circuit 120 may be provided by a programmable logic device (PLD), a field programmable gate array (FPGA), an application specific integrated circuit (ASIC), a central processor unit (CPU), a micro-controller unit (MCU) or another type of circuit with similar designs, which may be adapted (e.g., programmed) to perform the functions described herein.

The host control circuit 120, may further include functional partitions for a state machine logic 121, a memory 122, and an analog-to-digital converter 123. Analog signals such as from a voltage at node N2 may be monitored and evaluated by the host control circuit 120 with the ADC 123. Transmitted and received messages (e.g., TX MSG, RX MSG) may be stored in the memory 122 and evaluated by the control circuit 120 such as by a processor or a portion of the state machine logic 121.

Figure 2:
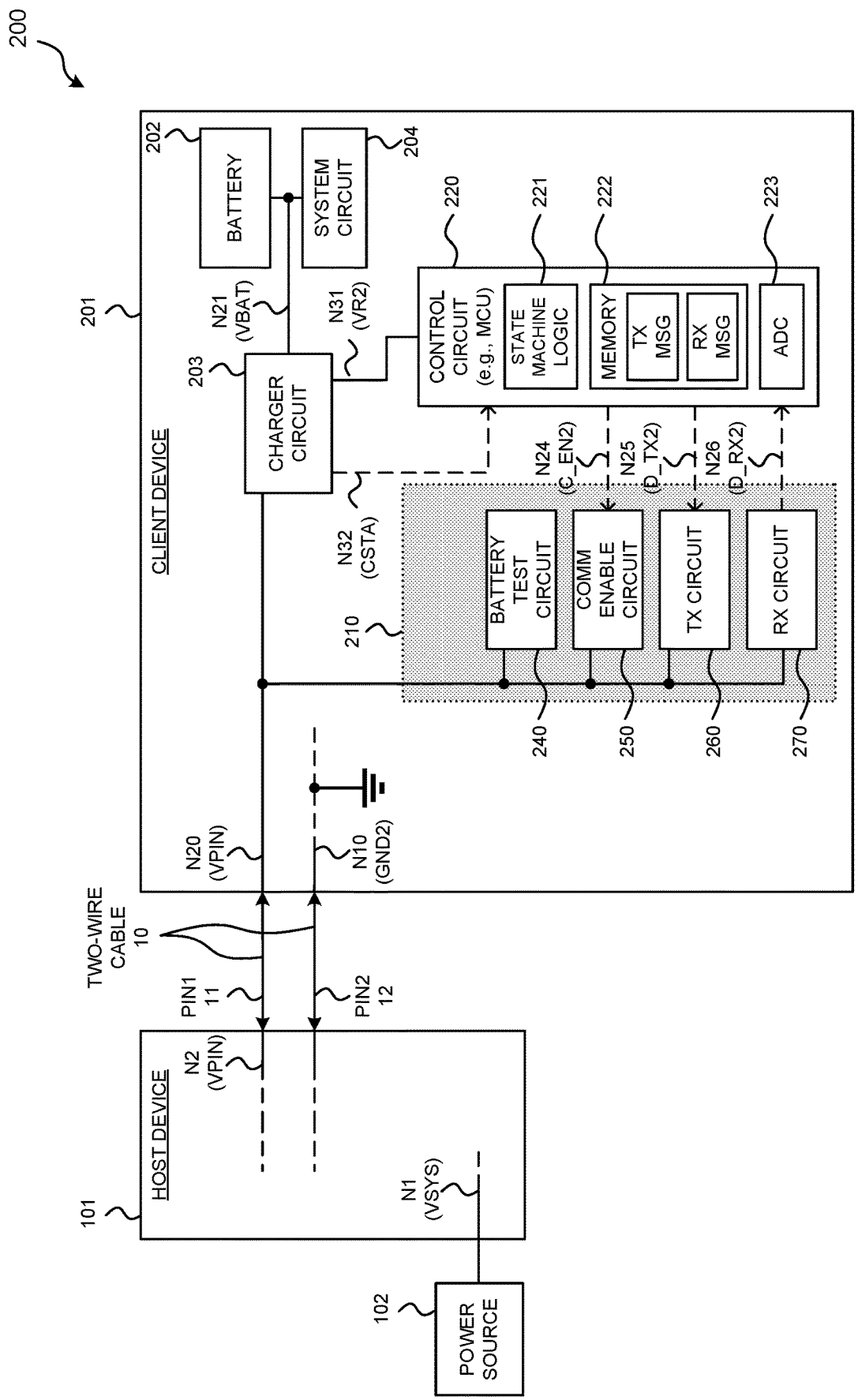
FIG. 2 shows a schematic diagram of another example power delivery and communication system.

FIG. 2 shows a schematic diagram of another example power delivery and communication system, arranged in accordance with additional aspects of the present disclosure. Like components and functional blocks from FIG. 1 are labelled identically, with components of the host device 101 omitted for brevity.

As shown in FIG. 2, the client device 201 includes a battery 202, a charger circuit 203, a system circuit 204, a client control circuit 220, and additional client support circuits 210. The client control circuit 220 is configured to selectively operate the client support circuits 210 to negotiate attachment, communications with the host device 101 by time-domain separated communications, and charging of the battery 202.

Also shown in FIG. 2 are additional details for the client support circuits 210 and the control circuit 220, and detailed connections for the charger circuit 203. The charger circuit 203 is coupled to a terminal PIN1 of the two-wire cable 10, which corresponds to node 20 or VPIN, and delivers charge to the battery 202 at node N21, which corresponds to a battery voltage VBAT. The charger circuit 203 may also be configured to deliver a reference voltage VR2 to the client control circuit 220 at node N31, and a charger status signal CSTA to the client control circuit 220 at node N32.

The client support circuits 210 may include a variety of individual circuits or functions, including, but not limited to a battery test circuit 240, a communication enable circuit 250, a transmitter circuit 260, and a receiver circuit 270.

These functional partitions of the client support circuits 210 are for illustrative purposes, and may be implemented in a different manner to achieve a similar or equivalent operation. It is thus contemplated that in some implementations the client support circuits 210 may be combined into fewer functional partitions, or separated into additional functional partitions to achieve a similar or equivalent operation.

The battery test circuit 240 is coupled to terminal 11 of the two-wire cable 10 at node N20. The battery test circuit 240 couples a first resistance to the terminal 11, which may correspond to an appropriate load resistor value as may be required for the host device 101 to detect attachment when the cable is attached between the host and client devices. In some examples, the first resistance is a pull-up resistor, while in other examples the first resistance is a pull-down resistor, depending on the implementation of the host device 101.

The communication enable circuit 250 is coupled to the terminal 11 at node N20, and is responsive to a communication enable signal C_EN2 at node N24. In various examples, the communication enable circuit 250 selectively couples a second resistance to the terminal 11 responsive the communication enable signal C_EN2. In some examples, the second resistance is a pull-up resistor coupled between the terminal and a high-side reference voltage (e.g., VDD, VH, etc.). In some other examples, the second resistance is a pull-down resistor coupled between node the terminal 11 and a low-side reference voltage (e.g., VSS, VL, GND, etc.). As will be described later, the second resistance may be used by various circuits in the system to aid in communications between the host device 101 and the client device 201.

The transmitter circuit 260 is coupled to the terminal 11 at node N20, and is responsive to a data transmit signal D_TX2 at node N15. In various examples, the transmitter circuit 260 selectively couples a small resistance value to the terminal 11 responsive to the data transmit signal D_TX2. The timing and speed of the selectively coupling of the transmitter circuit 260 is effective to modulate a data pattern for a multi-bit transmission responsive to the data transmit signal D_TX2. In some examples, the small resistance value is a pull-up resistor that is selectively coupled between node N1S and a high-side reference voltage (e.g., VDD, VH, etc.) according to a data pattern, where another resistance is coupled between terminal 11 and a circuit ground (GND1). In some other examples, the small resistance is a pull-down resistor that is selectively coupled between terminal 11 at node N20 and a low-side reference voltage (e.g., VSS, VL, GND, etc.) according to the data pattern, where another resistance is coupled between terminal 11 at node N20 and a high-side supply. The selective coupling of the small resistance value resistance may thus be used to aid in modulated signals for transmissions between the client device 201 and the host device 101.

The receiver circuit 270 is coupled to the terminal 11 at node N220 and also coupled to node N31. Received circuit 270 is configured to receive modulated signals from the terminal 11 at node N20 to generate a data receive signal D_RX2 at node N26. Example receiver operation will be described further below.

Client control circuit 220 includes several internal functions, which can broadly be described as attachment detection, detachment detection, dead battery detection, dead battery recovery, data transmission, data reception, and charger operation. These functions may be provided by individual circuits, analog and/or digital, or combined into operation of a single circuit. Additionally, these functions are coordinated by operation of the client control circuit 220, by asserting, de-asserting, or adjusting various control signal such as one or more of the communication enable signal C_EN2 at node N24, the data transmission signal D_TX2 at node N25, and the data receive signal D_RX2 at node N26.

In some examples, the functions of the client control circuit 220 may be provided by a programmable logic device (PLD), a field programmable gate array (FPGA), an application specific integrated circuit (ASIC), a central processor unit (CPU), a micro-controller unit (MCU) or another type of circuit with similar designs, which may be adapted (e.g., programmed) to perform the functions described herein.

The client control circuit 220, may further include functional partitions for a state machine logic 221, a memory 222, and an analog-to-digital converter 223. Analog signals such as from a voltage at node N20 may be monitored and evaluated by the client control circuit 220 with the ADC 223. Transmitted and received messages (e.g., TX MSG, RX MSG) may be stored in the memory 222 and evaluated by the client control circuit 220 such as by a processor or a portion of the state machine logic 221.

Figure 3:
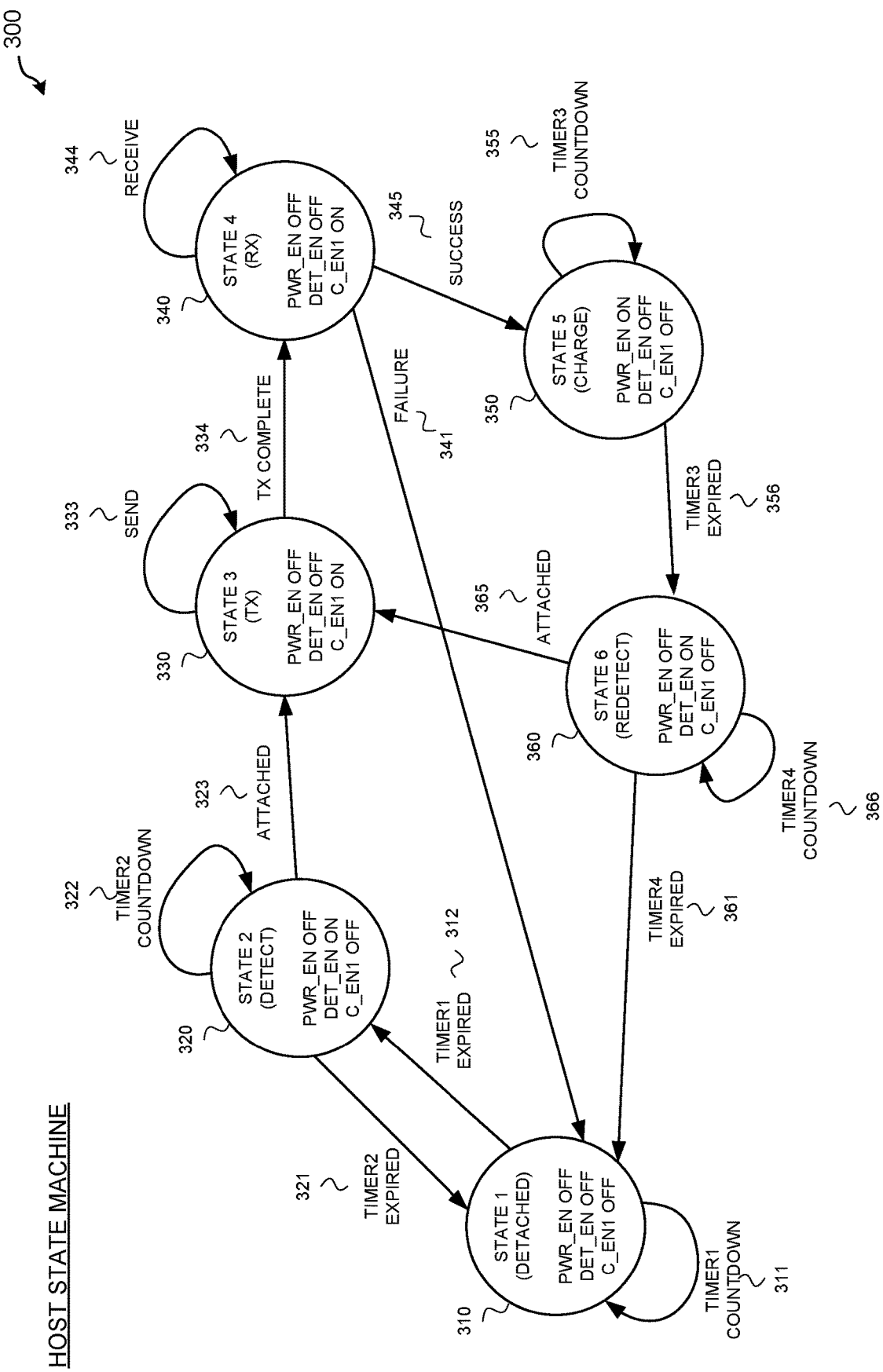
FIG. 3 shows a detailed state machine diagram for a host device in an example power delivery and communication system.

The described communications interfaces may support adapting the charger current limits to control speed of charge and heat dissipation. The communication methods are operated over the power lines, allowing the use of two pin charging connectors. All communication occurs out of phase with power delivery, where communications occur when power delivery is halted The host device 101 is responsible for initiating communication, controlling the communication flow, delivering power, as well as re-initiating/terminating the attachment. The host device 101 utilizes a state machine topology to control the communication and power delivery to the client device 201. The state machine has number of operating as will be described below FIG. 3 shows a detailed state machine diagram 300 for a host device in an example power delivery and communication system, arranged in accordance with some additional aspects of the present disclosure. As illustrated, a host state machine 300 may include up to six operating states designated as states 310, 320, 330, 340, 350 and 360.

In a first state 310, STATE 1 (DETACHED), the host device 101 is considered detached or disconnected from the client device 201 and the host control circuit 120 disables some of the host support circuits 110 from operation by adjusting their various control signals. In a particular example, the host device charging circuits and communication circuits (e.g., load switch circuit 104, communication enable circuit 150, TX circuit 160, RX circuit 170, etc.) may be disabled by adjusting their respective control signals (e.g., PWR_EN=OFF, C_EN1=OFF, etc.). The attachment test circuit 140 may also be disabled or deactivated in this first state 310 by adjusting the respective control signal (e.g., DET_EN=OFF). Also, the host device 101 starts or initiates a first timer (TIMER1) in this first state 310, which may be part of the host controller circuit 120 or external therefrom (not shown). The first timer (TIMER1) is operated 311 as either a count-down or count-up timer until the timer has expired or elapsed. After the first timer (TIMER1) has expired or elapsed 312, the host state machine 300 transitions from the first state 310 to the second state 320. In other words, in the first state 310, the host device 101 and state machine 300 are generally configured for disabling host device charging and communication circuits, operating a first timer 311, and transitioning to a second state 320 after the first timer expires 312.

In the second state 320, STATE 2 (DETECT), the host device 101 negotiates detection of a client device 201 and the host control circuit 120 enables one or more of the host support circuits 110 into operation by adjusting their corresponding control signals. In a particular example, the host device charging circuits and communication circuits (e.g., load switch circuit 104, while the attachment test circuit 140 is enabled or activated, each by adjusting their respective control signal (e.g., PWR_EN=OFF, C_EN1=OFF, DET_EN=ON). Also, the host device 101 starts or initiates a second timer (TIMER2) in this second state 320, which may be part of the host controller circuit 120 or external therefrom (not shown). The second timer (TIMER2) is operated 322 as either a count-down or count-up timer until the timer has expired or elapsed. Up until the second timer has elapsed or expired, the client device 201 may be detected by monitoring a status of the two-wire cable 10, while the attachment test circuit 140 is active. If the attachment is detected during this detection time period set by the second timer, then the host state machine 300 transitions from the second state 320 to the third state 330. Otherwise, after the second timer (TIMER2) has expired or elapsed, the host state machine 300 transitions from the second state 320 to the first state 310. In other words, in the second state 320, the host device 101 and state machine 300 are generally configured for operating a second timer while monitoring a status of the two-wire cable 10, transitioning to a third state 330 when the second timer has not expired and a status of the two-wire cable 10 is detected as attached 323, and transitioning to the first state 310 when the second timer has expired 321.

While the attachment test circuit 140 is enabled or active in the second state, a voltage VPIN associated with a terminal 11 (or node N2) of the two-wire cable 10 will change when the client device 201 is attached. Thus, the host control circuit 120, which may include an ADC 123, can be configured to monitor, and evaluate the voltage VPIN associated with the terminal 11 of the two-wire cable 10 to detect a change in the status of the connection from detached to attached. Thus, in some detailed examples, monitoring the status of the two-wire cable 10 may include coupling the attachment test circuit 140 to the terminal 11 of the two-wire cable 10, and evaluating a voltage VPIN associated with the terminal 11 of the two-wire cable 10 when the attachment test circuit (140) is active.

Some example attachment test circuits 140 include a pull-up resistor that is selectively coupled between the terminal (11, node N2) and a reference voltage VR1, when activated. With an open circuit condition of a detached cable or disconnected client device 201, the pullup resistor will urge the voltage of the terminal 11 to the first reference voltage VR1. With a client device connection, a pull-down resistance may be presented to terminal 11 by the client device and the voltage at terminal 11 will change to a different value that is less than the reference voltage VR1. Thus, in some detailed examples, coupling the attachment test circuit 140 to the terminal 11 of the two-wire cable 10 may include coupling a pullup resistor from a first reference voltage VR1 to a terminal 11 of the two-wire cable 10, where the voltage VPIN associated with the terminal 11 of the two-wire cable varies based on the pullup resistor of the host device 101 and one or more corresponding pull-down resistors associated with the client device 201. The specific values of the voltages can be varied based on the resistance values, and the designation of the pull-up and pull-down resistors may be swapped in some implementations.

In the third state 330, STATE 3 (TX), the host device 101 negotiates communication (e.g., transmission) with the client device 201 by enabling one or more of the host support circuits 110 into operation by adjusting their corresponding control signals. In a particular example, the attachment test circuit 140, the host device charging circuit (e.g., load switch circuit 104), and some of the communication circuits (RX circuit 170, etc.) are disabled or deactivated, each by adjusting the respective control signal by their respective control signals (e.g., PWR_EN=OFF, DET_EN=OFF, etc.). The communication enable circuit 150 may be activated or enabled in this third state 330 by adjusting the respective control signal (e.g., C_EN1=ON). Also, the host device 101 sends 333 data (D_TX1) for a message to the transmitter circuit 160, which effectively modulates or encodes the data transmission to send the message to the client device 201 over the two-wire cable 10. After the data transmission (TX) is complete 334, the host state machine 300 transitions from the third state 330 to the fourth state 340. In other words, in the third state 330, the host device 101 and state machine 300 are generally configured for enabling host device communication circuits to send 333 a first message to the two-wire cable 10, and transitioning to a fourth state 340 after the transmission of the first message is complete 334.

Figure 6:
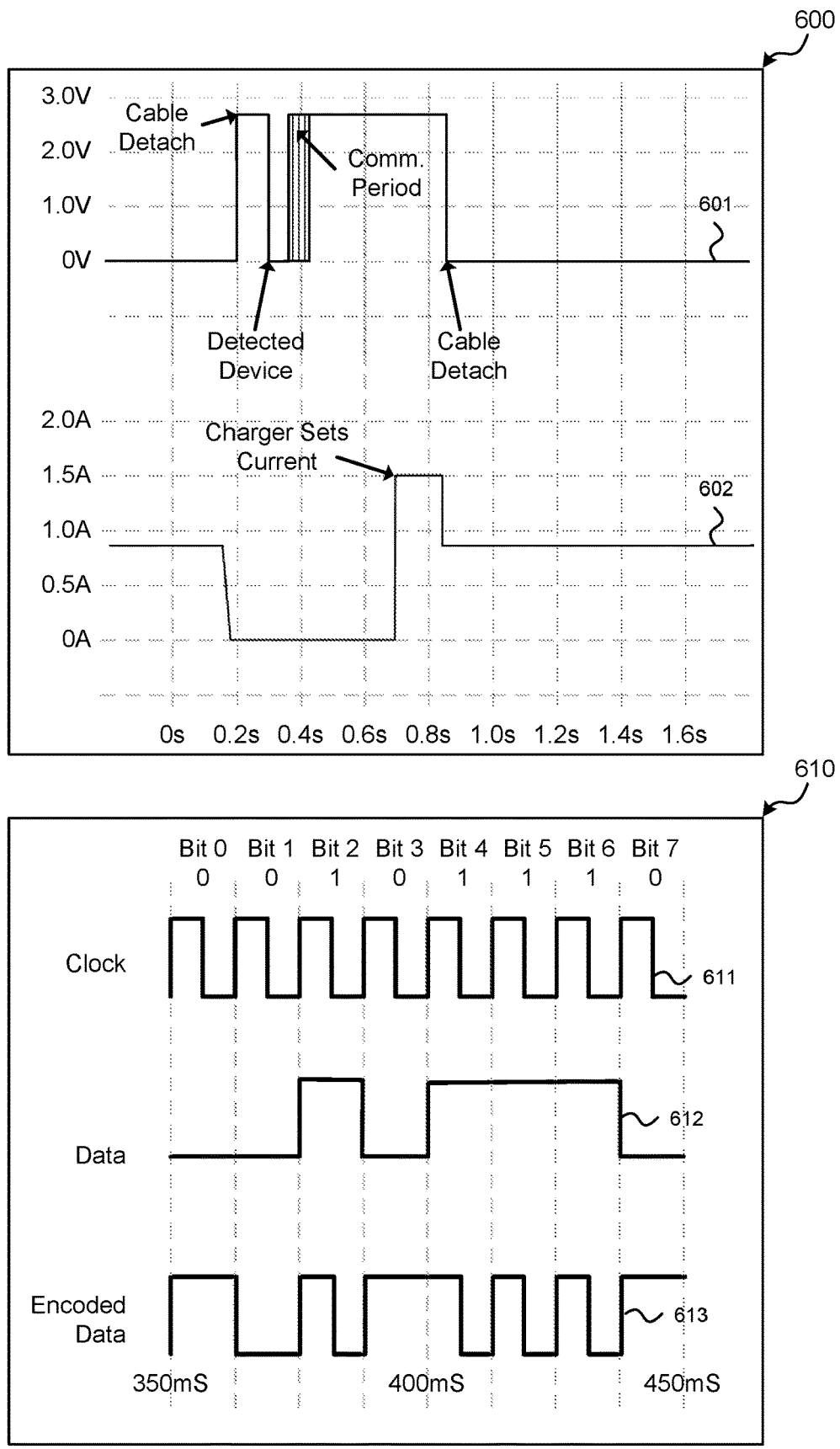
FIG. 6 shows graphs illustrating example timings for an example power delivery and communication system.

As will be further described with respect to FIG. 6, the host device 101 may modulate or encode the message for transmission using any appropriate scheme, including but not limited to Manchester encoding and Bi-phase Mark Coding (BMC). In some examples, enabling the host device communication circuits to send 333 a first message to the two-wire cable 10 may include encoding the first message with a Manchester code scheme, and modulating a signal associated with the two-wire cable 10 with the Manchester encoded first message. In some other examples, enabling the host device communication circuits to send 333 a first message to the two-wire cable 10 may include encoding the first message with a Bi-phase Mark Code (BMC) scheme, and modulating a signal associated with the two-wire cable 10 with the Bi-phase Mark Code encoded first message.

Figure 7:
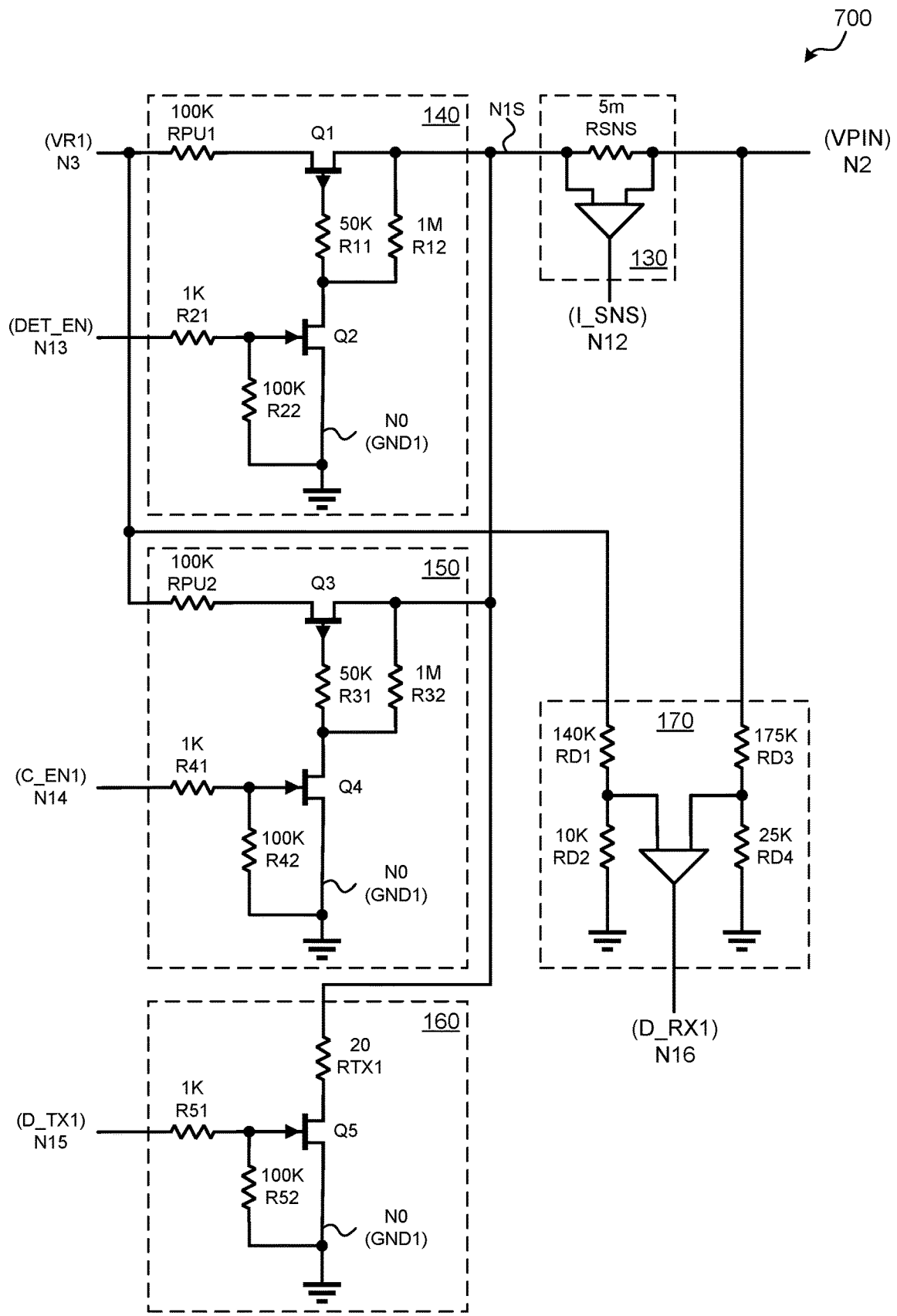
FIG. 7 shows a detailed schematic diagram of host support circuits in an example power delivery and communication system.
Figure 8:
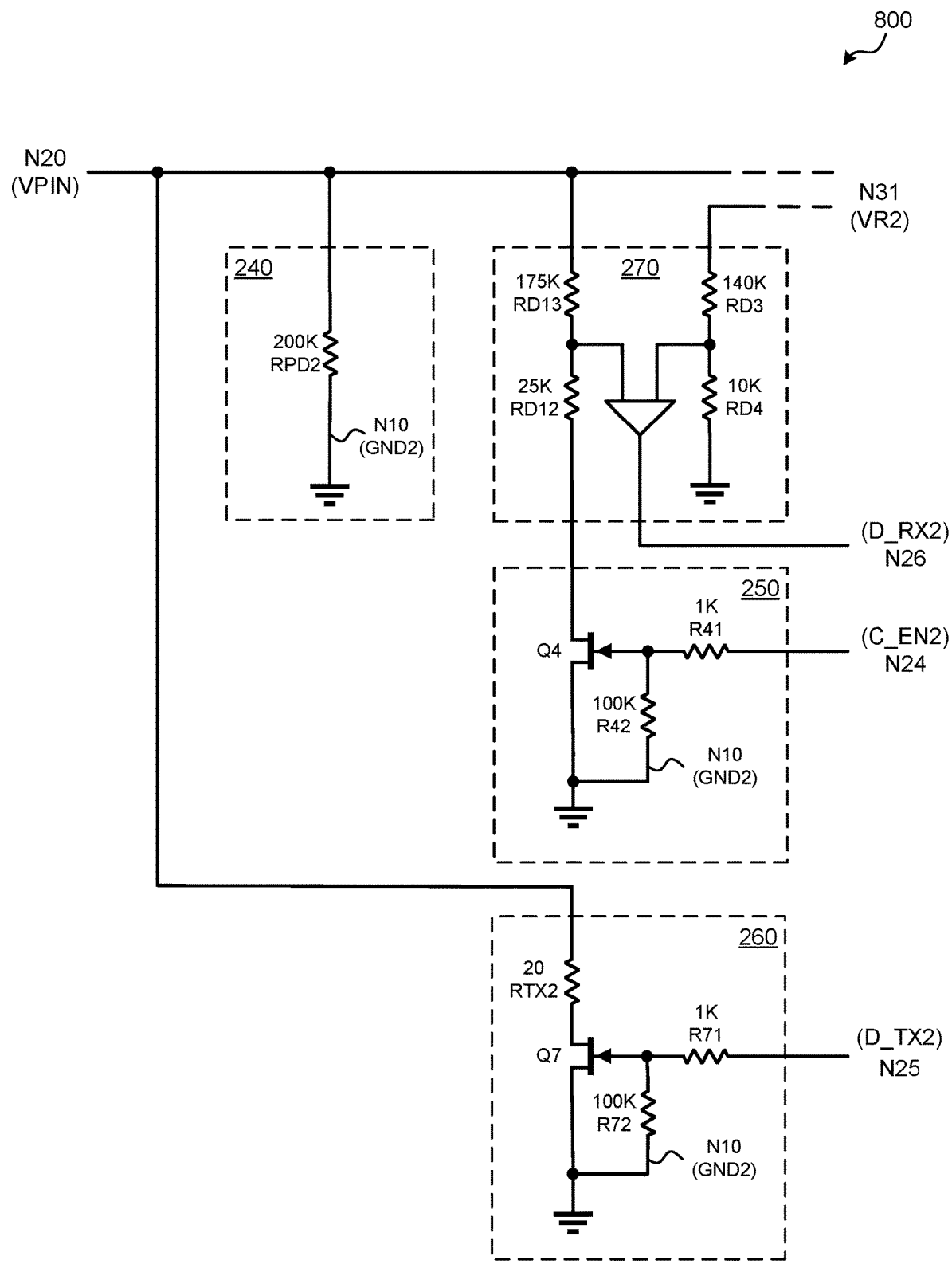
FIG. 8 shows a detailed schematic diagram of client support circuits in another example power delivery and communication system.

As will be further described with respect to FIGS. 7 and 8, modulation or encoding of a data transmission may be accomplished by way of the described circuits. For example, during a transmit period of the host device 101, a pullup resistor may be coupled from a first reference voltage VR1 to a terminal 11 of the two-wire cable 10 by the communication enable circuit, while a pulldown resistor may be selectively coupled from the terminal 11 to a ground reference GND1 based on the data to be transmitted. Thus, in some examples, enabling the host device 101 communication circuits to send 333 the first message to the two-wire cable 10 may include: before a transmit period commences, coupling a pullup resistor from a first reference voltage VR1 to a terminal 11 of the two-wire cable 10; during the transmit period, selectively coupling a pulldown resistor from the terminal 11 of the two-wire cable 10 to the ground reference GND1 responsive to data bit values of a packet for the first message to modulate the transmission by selective operation of the pulldown resistor; and after the transmit period ends, decoupling the pulldown resistor from the terminal 11 of the two-wire cable 10.

In the fourth state 340, STATE 4 (RX), the host device 101 negotiates communications (e.g., reception) with the client device 201 by enabling one or more of the host support circuits 110 into operation by adjusting their corresponding control signals. In a particular example, the attachment test circuit 140, the host device charging circuit (e.g., load switch circuit 104), and some of the communication circuits (TX circuit 160, etc.) are disabled or deactivated, each by adjusting the respective control signal by their respective control signals (e.g., PWR_EN=OFF, DET_EN=OFF, etc.). The communication enable circuit 150 may be activated or enabled in this fourth state 340 by adjusting the respective control signal (e.g., C_EN1=ON). Also, the host device 101 receives 344 data (D_RX1) for a message from the receiver circuit 170, which effectively demodulates or decodes the data transmission received from the client device 201 over the two-wire cable 10. After the data reception (RX) is complete, the host device evaluates the message to determine if the negotiated communication was successful or a failure. When the received message is evaluated and identified as a successful negotiation (SUCCESS), the state machine 300 transitions 345 from the fourth state 340 to the fourth state 340. Otherwise, when the received message is evaluated and identified as a failed negotiation (FAILURE), the state machine 300 transitions 341 from the fourth state 340 to the first state 310. In other words, in the fourth state 340, the host device 101 and state machine 300 are generally configured for enabling host device communication circuits to receive 344 a second message from the two-wire cable 10, transitioning to a fifth state 350 when the second message received indicates receipt success 345, and transitioning to the first state 310 when the second message received indicates receipt failure 341.

As will be further described with respect to FIGS. 7 and 8, demodulation or decoding of a data transmission may be accomplished by way of the described circuits. For example, during a receive period of the host device 101, a pullup resistor may be coupled from a reference voltage VR1 to a terminal 11 of the two-wire cable 10 by the communication enable circuit, while a pulldown resistor in the client device 201 may be selectively coupled from the terminal 11 to a ground reference GND2 based on the data to be transmitted by the client device 201. Thus, in some examples, enabling the host device 101 communication circuits to receive 344 the second message from the two-wire cable 10 may include, before a receive period commences, coupling a pullup resistor from a first reference voltage VR1 to a terminal 11 of the two-wire cable 10, where the pullup resistor is configured to cooperatively modulate data transmitted by the client device 201 during the receive period; during the receive period, comparing a signal associated with the terminal 11 of the two-wire cable 10 to a reference value to generate received data; and after the receive period ends, decoupling the pullup resistor from the terminal 11 of the two-wire cable (10).

In the fifth state 350, STATE 5 (CHARGE), the host device 101 negotiates charging of the client device 201 by enabling or activating host device charging circuits and disabling or deactivating one or more of the host support circuits 110 by adjusting their corresponding control signals. In a particular example, the host device charging circuits (e.g., load switch circuit 104) are enabled or activated and the attachment test circuit 140 and communication circuits (e.g., each by adjusting the respective control signal by their respective control signals (e.g., PWR_EN=ON, DET_EN=OFF, C_EN1=OFF, etc.). Charging will continue in this fifth state, until either the charging is complete or the status of the two-wire cable is detected as detached. In other words, in the fifth state 350, the host device 101 and state machine 300 are generally configured for. enabling host device charging circuits to couple power to the two-wire cable 10 while monitoring the status of the two-wire cable 10, and transitioning to the first state 310 when either charging is complete or the status of the two-wire cable (10) is detached.

In some examples, in the fifth state, the host device 101 may be configured to monitor charge delivery to the client device 201. For example, the charge sense circuit 130 may provide a sense signal (I_SNS) to the host control circuit 120 (e.g., to ADC 123), where the host control circuit 120 monitors the power consumption of the client device 201 based on the sense signal to determine when charging of the client device 201 is complete. When the power consumption drops below a certain level (e.g., I_SNS<I_MIN), the host device 101 may discontinue charging and transition back to the detached state (310).

In some examples, the state machine 300 may transition from the fifth state 350 to a sixth state 360 so that a valid cable connection may be verified during charging. For example, the host device 101 may start or initiate a third timer (TIMER3) in this fifth state 350, which may be part of the host controller circuit 120 or external therefrom (not shown). The third timer (TIMER3) may be operated 355 as either a count-down or count-up timer until the timer has expired or elapsed. Up until the second timer has elapsed or expired, the host device 101 may continue to charge the client device 201. After the third timer (TIMER3) has expired or elapsed, the host state machine 300 transitions from the fifth state 350 to the sixth state 360. In other words, in the fifth state 320, the host device 101 and state machine 300 are generally configured for operating a third timer while enabling host device charging circuits to couple power to the two-wire cable 10, and transitioning to a sixth state 360 when the third timer expires 356.

In the sixth state 360, STATE 6 (REDETECT), the host device 101 negotiates redetection of the client device 201 by disabling or deactivating host device charging circuits and enabling or activating one or more of the host support circuits 110 by adjusting their corresponding control signals. In a particular example, the host device charging circuit (e.g., load switch circuit 104) and the communication circuits (e.g., communication enable circuit 150, TX circuit 160, RX circuit 170, etc.) are disabled or deactivated and the attachment test circuit 140 is enabled or activated, each by adjusting the respective control signal by their respective control signals (e.g., PWR_EN=OFF, DET_EN=ON, C_EN1=OFF, etc.). Charging is ceased in this sixth state, while the status of the two-wire cable is evaluated to verify a valid attachment. Also, the host device 101 starts or initiates a fourth timer (TIMER4) in this sixth state 360, which may be part of the host controller circuit 120 or external therefrom (not shown). The fourth timer (TIMER4) is operated 322 as either a count-down or count-up timer until the timer has expired or elapsed. Up until the fourth timer has elapsed or expired, the client device 201 may be detected by monitoring a status of the two-wire cable 10, while the attachment test circuit 140 is active. If the attachment is detected during this detection time period 365 set by the fourth timer, then the host state machine 300 transitions from the sixth state 360 to the third state 330, where communication may be re-established. Otherwise, after the fourth timer (TIMER4) has expired or elapsed 361, the host state machine 300 transitions from the sixth state 360 to the first state 310. In other words, in the sixth state 360, the host device 101 and state machine 300 are generally configured for operating a fourth timer while monitoring the status of the two-wire cable 10, transitioning to the third state 330 when the fourth timer has not expired and the status of the two-wire cable 10 is detected as attached 365, and transitioning to the first state (310) when the fourth timer has expired.

Although the above state diagram illustrates binary conditions for ON and OFF for the various control signal adjustments, these designations of ON and OFF are merely examples. In some examples, the control signals may correspond to a binary values such as a logic 1 or logic 0, while in other examples the control signals may be multibit digital values (e.g., 2-bits, 3-bits, 4-bits, 8-bits, N-bits, etc.), while in still other examples the control signals may be analog values such as a desired voltage or current signal as may be required by the specific circuit.

Figure 4:
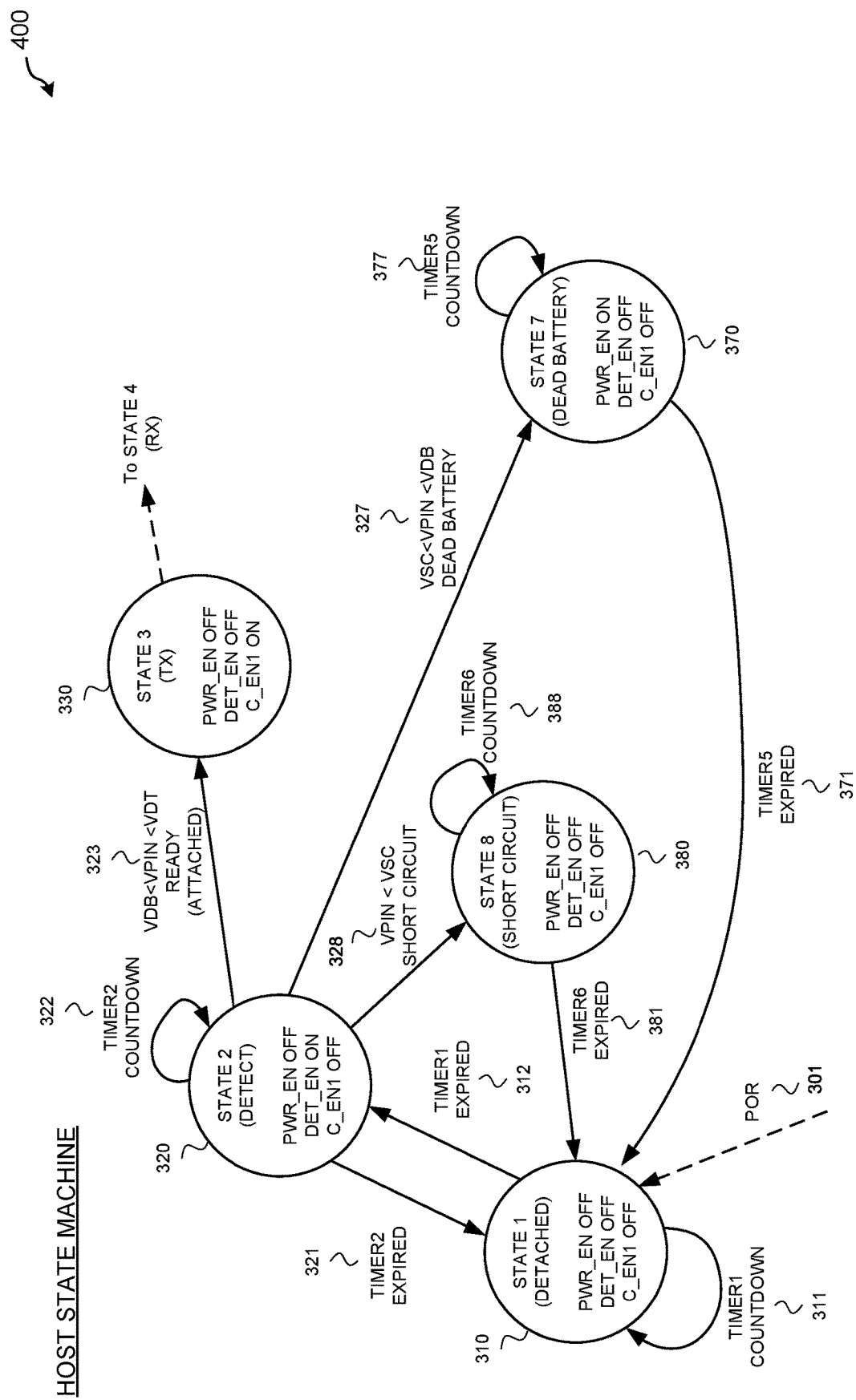
FIG. 4 shows a detailed state machine diagram for additional states in a host device of another example power delivery and communication system.

FIG. 4 shows a detailed state machine diagram for additional states 400 for a host device of another example power delivery and communication system, arranged in accordance with yet additional aspects of the present disclosure. As illustrated, a host state machine 300 may include up to eight operating states designated as states 310, 320, 330, 340, 350, 360, 370 and 380. Like elements from FIG. 3 are labelled identically, and some of the discussion is eliminated for brevity (e.g., states 340, 350, 360).

For the example of FIG. 3, the initial starting state for the host state machine may be initialized (301) to start in the first state 310 (STATE 1), which corresponds to the detached state. The initialization 301 may be implemented as part of a power-on-reset (POR) or startup condition of the host device 101. Thus, in some examples, the host device 101 and state machine 300 are generally configured for initializing the host device 101 to operate in the first state 310. The first state 310 is otherwise substantially the same as described previously.

In the second state 320 of FIG. 4, general operation of detection is similar to the manner as described with respect to FIG. 3. However, additional details are included for different transitions as may be required for states 330, 370 and 380. In particular, the host control circuit 120 is further configured to monitor the status of the two-wire cable 10 for additional conditions associated with the client device 201, while the attachment test circuit 140 is active. The additional conditions may be identified by different voltage levels that are detected at the terminal 11 of the host device 101. More particularly, detachment from a client device may be detected when an open circuit or high impedance condition is identified by a sensed voltage VPIN at the terminal 11 in a first range (e.g. VPIN>VDT, or DETACHED), attachment to a client device may be detected when the sensed voltage VPIN corresponds to a second range (e.g., VDB<VPIN<VDT, or READY), a dead battery condition may be detected when the sensed voltage VPIN corresponds to a third range (e.g., VSC<VPIN<VDB, or DEAD BATTERY), and a short circuit condition may be detected when the sensed voltage VPIN corresponds to a fourth range (VPIN<VSC, or SHORT CIRCUIT). If the attachment is detected, then the host state machine 300 again transitions 323 from the second state 320 to the third state 330. If the dead battery condition is detected, then the host state machine 300 transitions 327 from the second state 320 to the seventh state 370. If the short-circuit condition is detected, then the host state machine 300 transitions 328 from the second state 320 to the eighth state 3890. Otherwise, after the second timer (TIMER2) has expired or elapsed 321, the host state machine 300 transitions from the second state 320 to the first state 310. Thus, in some examples, the host device 101 and state machine 300 are generally configured for transitioning from the second state 320 to a seventh state 370 when the second timer has not expired and the status of the two-wire cable 10 is determined as a dead battery. Also, in some other examples, the host device 101 and state machine 300 are generally configured for transitioning from the second state 320 to an eighth state 380 when the second timer has not expired and the status of the two-wire cable 10 is determined as a short circuit.

The specific values for each of these voltages and ranges may be determined by the specific values of circuit components used in the host and client devices, as well as the reference voltage VR1. In some examples, a thermometer coding scheme may be used to detect the various conditions. For example, an open circuit condition may be detected using a pull-up to a high-supply reference voltage (e.g., VR1), while a short circuit condition may be detected from a short to a circuit ground (e.g., 0V). For this type of circuit topology, a thermometer code scheme that may be used to designate trip points for each condition is as follows:

TABLE 1

| Detected Condition | Middle Value | Lower Name | Lower Value | Upper Name | Upper Value | Range |
|---|---|---|---|---|---|---|
| DETACHED | 3.5 V | VDT | 3.0 V | VR1 | 4.0 V | VPIN > 3 V |
| DEAD BATTERY | 2.5 V | VDB | 2.0 V | VDT | 3.0 V | 2 V < VPIN < 3 V |
| READY | 1.5 V | VSC | 1.0 V | VDB | 2.0 V | 1 V < VPIN < 2 V |
| SHORT CIRCUIT | 0.5 V | GND | 0.0 V | VSC | 1.0 V | VPIN < 1 V |

In another example, an open circuit condition may be detected using a pull-down to a circuit ground (e.g., 0V), while a short-circuit condition maybe detected from a short to a high-supply reference voltage (e.g., VR1). For this type of circuit topology, a thermometer code scheme that may be used to designate trip points for each condition is as follows:

TABLE 2

| Detected Condition | Middle Value | Lower Name | Lower Value | Upper Name | Upper Value | Range |
|---|---|---|---|---|---|---|
| DETACHED | 0.5 V | GND | 0.0 V | VDT | 1.0 V | VPIN < 1 V |
| DEAD BATTERY | 1.5 V | VDT | 1.0 V | VDB | 2.0 V | 1 V < VPIN < 2 V |
| READY | 2.5 V | VDB | 2.0 V | VSC | 3.0 V | 2 V < VPIN < 3 V |
| SHORT CIRCUIT | 3.5 V | VSC | 3.0 V | VR1 | 4.0 V | VPIN > 3 V |

Although the above tables are referenced to a 4.0V type of reference, any appropriate value may be used. Also, the nominal reference values and ranges may be varied based on the specific implementation and need not be equal portions. For example, in a simple implementation, the reference and range values may simply be determined as percentages or fractions of the reference voltage as follows: VSC=VR¼, VDB=VR⅓, VDT=VR½; or inversely VDT=VR¼, VDB=VR⅓, VSC=VR½. Other examples are also contemplated and within the scope of this disclosure.

In the seventh state 370, STATE 7 (DEAD BATTERY), the host control circuit 120 enables or disables the operation of the various host support circuits 110 by adjusting their corresponding control signals. In a particular example, attachment test circuit 140 and the communication circuits (communication enable circuit 150, TX circuit 160, RX circuit 170, etc.) are disabled or deactivated, while the charging circuits (e.g., load switch circuit 104) are enabled or activated, each by adjusting their respective control signal (e.g., PWR_EN=ON, C_EN1=OFF, DET_EN=OFF). Also, the host device 101 starts or initiates a fifth timer (TIMER5) in this seventh state 370, which may be part of the host controller circuit 120 or external therefrom (not shown). The fifth timer (TIMER5) is operated 377 as either a count-down or count-up timer until the timer has expired or elapsed. Up until the fifth timer has elapsed or expired, charge is delivered from the host device 101 to the client device 201 in an attempt to recharge the dead battery, which can be done at a reduced charging current level. After the fifth timer (TIMER5) has expired or elapsed, the host state machine 300 transitions from the seventh state 370 to the first state 310. In other words, in the seventh state 370, the host device 101 and state machine 300 are generally configured for operating a fifth timer and enabling host device charging circuits to couple power to the two-wire cable 10 (which may be at a reduced charge level), and transitioning to the first state 310 after the fifth timer expires 371.

In the eighth state 380, STATE 8 (SHORT CIRCUIT), the host control circuit 120 disables various host support circuits 110 from operation by adjusting their corresponding control signals. In a particular example, the attachment test circuit 140, the charging circuits (e.g., load switch circuit 104), and the communication circuits (communication enable circuit 150, TX circuit 160, RX circuit 170, etc.) are disabled or deactivated, by adjusting their respective control signal (e.g., PWR_EN=OFF, C_EN1=OFF, DET_EN=OFF). Also, the host device 101 starts or initiates a sixth timer (TIMER6) in this eighth state 380, which may be part of the host controller circuit 120 or external therefrom (not shown). The sixth timer (TIMER6) is operated 388 as either a count-down or count-up timer until the timer has expired or elapsed. After the sixth timer (TIMER6) has expired or elapsed, the host state machine 300 transitions from the eight state 380 to the first state 310. In other words, in the seventh state 380, the host device 101 and state machine 300 are generally configured for operating a sixth timer and disabling host device charging and communication circuits, and transitioning to the first state 310 after the sixth timer expires 381.

Figure 5:
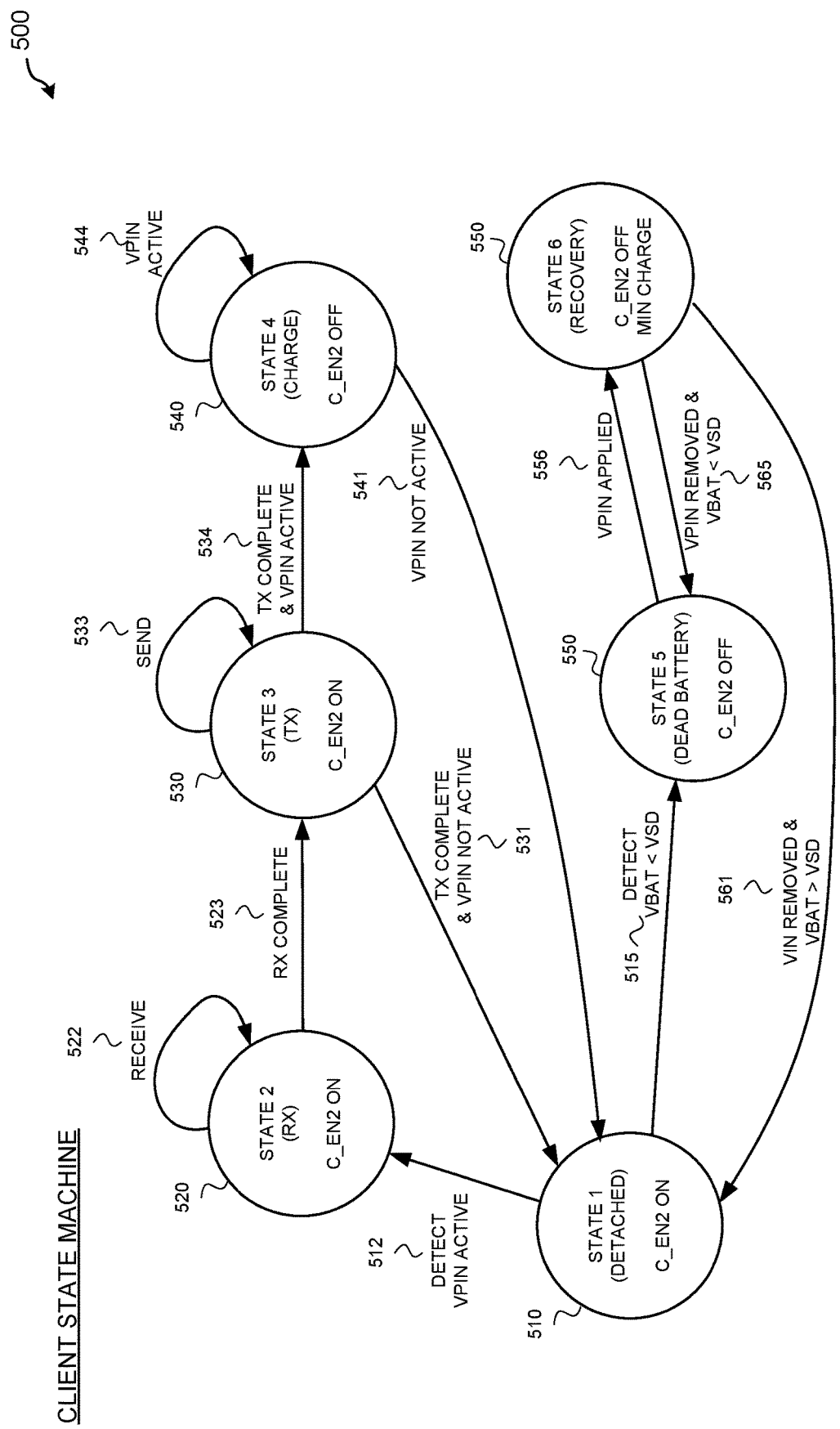
FIG. 5 shows a detailed state machine diagram for a client device in an example power delivery and communication system.

FIG. 5 shows a detailed state machine diagram 500 for a client device in an example power delivery and communication system, arranged in accordance with still additional aspects of the present disclosure. As illustrated, a client state machine 500 may include up to six operating states designated as states 510, 520, 530, 540, 550 and 560. The operation of the client state machine 500 depends on the agreed upon protocol of the host state machine, such as previously discussed herein. States 510, 520, 530, and 540 correspond to normal operational states, while states 550 and 560 correspond to error states.

In the first state 510, STATE 1 (DETACHED), the client device 201 is considered detached or disconnected from the host device 201. In this state, the client device 201 negotiates attachment of a host device 101 and the client control circuit 120 enables one or more of the client support circuits 110 into operation by adjusting their corresponding control signals. In a particular example, the client device charger circuit 203 and communication circuits (e.g., TX circuit 160, RX circuit 170, etc.) may be disabled or deactivated, while the communication enable circuit 250 is enabled or active, each adjusting their respective control signals (e.g., C_EN2=ON, etc.). The battery test circuit 240 remains activated for all states of the client device 201. Also, the client device 201 is configured to monitor a voltage (e.g., VPIN) associated with the two-wire cable to determine when attachment to the host device has commenced. After the voltage associated with the two-wire cable 10 has been determined to be active, the client state machine 500 transitions from the first state 510 to a second state 520. In other words, in the first state 510, the client device 201 and state machine 500 are generally configured for coupling a battery test circuit 240 to a terminal 11 of the two-wire cable 10; activating a communication enable circuit 250 and monitoring a voltage of the two-wire cable 10; and transitioning to a second state 520 when the voltage of the two-wire cable 10 is detected as active 512.

In some examples, the client device 201 is also configured to monitor a battery voltage (e.g., VBAT) of the client device 201 in the first state 510. For these examples, the client state machine 500 is configured to transition from the first state 510 to a fifth state 550 when the battery voltage (VBAT) is detected to be below a shut-down voltage threshold (e.g., VBAT<VSD). Thus, in some examples, the client device 301 and state machine 500 are generally configured for transitioning from the first state 510 to a fifth state 550 when a battery voltage VBAT of the client device 201 is detected 515 below a shut-down threshold voltage VSD.

In the second state 520, STATE 2 (RX), the client device 201 is considered attached or connected to the host device 201. In this state, the client device 201 negotiates communications (e.g., receiving) with the host device 101 and the client control circuit 220 disables and enables various client support circuits 210 by adjusting their various control signals. In a particular example, some communication circuits (e.g., TX circuit 270, etc.) may be disabled or deactivated, while the communication enable circuit 250 and the receiver circuit 260 are enabled or active, each adjusting their respective control signals (e.g., C_EN2=ON, etc.). The battery test circuit 240 continues to remain active. Also, the client device 201 receives 522 data (D_RX2) for a message from the receiver circuit 270, which effectively demodulates or decodes the data transmission received from the host device 101 over the two-wire cable 10. After the data reception (RX) is complete, the client device 201 transitions from the second state 520 to the third state 530. In other words, in the second state 520, the client device 201 and state machine 500 are generally configured for enabling client device communication circuits to receive 522 a first message from the two-wire cable 10, and transitioning to the third state 350 after the first message is received (523).

As will be further described with respect to FIGS. 7 and 8, demodulation or decoding of a data transmission may be accomplished by way of the described circuits. For example, during a receive period of the client device 201, a pullup resistor in the host device 101 may be coupled from a reference voltage VR1 to a terminal 11 of the two-wire cable 10, while a pulldown resistor in the host device 101 may be selectively coupled from the terminal 11 to a ground reference GND1 based on the data or first message to be transmitted to the client device 201. During the receive period of the client device, the signal associated with the terminal 11 of the two-wire cable 10 is compared to a reference value (e.g., VR2) to generate received data (D_RX2).

In the third state 530, STATE 3 (TX), the client device 201 negotiates communications (e.g., transmission) with the host device 101 and the client control circuit 220 disables and enables various client support circuits 210 by adjusting their various control signals. In a particular example, some communication circuits (e.g., RX circuit 270, etc.) may be disabled or deactivated, while the communication enable circuit 250 and the transmitter circuit 260 are enabled or active, each adjusting their respective control signals (e.g., C_EN2=ON, etc.). The battery test circuit 240 continues to remain active. Also, the client device 201 sends 533 data (D_TX2) for a message to the transmitter circuit 260, which effectively modulates or encodes the data transmission to send the message to the host device 101 over the two-wire cable 10. After the data transmission (TX) is complete 534, the client state machine 500 evaluates the voltage associated with the two-wire cable 10 to determine if the connection is still active. When the voltage of the two-wire cable detected as active, the state machine 500 transitions 534 from the third state 530 to the fourth state 540. Otherwise, when the voltage of the two-wire cable 10 detected as inactive, the state machine 500 transitions 531 from the third state 530 to the first state 510. In other words, in the third state 530, the client device 201 and state machine 500 are generally configured for enabling client device communication circuits to transmit 533 a second message to the two-wire cable 10, transitioning to a fourth state 540 when the second message is transmitted and the voltage of the two-wire cable 10 is detected as active 534, and transitioning to the first state 510 when the voltage of the two-wire cable 10 is detected as inactive 531.

In the fourth state 540, STATE 4 (CHARGE), the client device 201 negotiates charging of the battery 202 with power from the two-wire cable 10, while also deactivating or disabling the communication circuits, by adjusting their various control signals. In a particular example, the communication enable circuit 250, transmitter circuit 260, and receiver circuit 250 may be disabled or deactivated, by each adjusting their respective control signals (e.g., C_EN2=OFF, etc.). Also, the charger circuit 203 is enabled or activated to deliver charging current to the battery 202 while the voltage of the two-wire cable 10 is detected as active 544 by the client control circuit 220. When the client control circuit 220 determines that the voltage of the two-wire cable 10 indicates a lost connection or detachment of the two-wire cable 10, then the state machine 500 transitions 541 from the fourth state 540 to the first state 510. In other words, in the fourth state 540, the client device 201 and state machine 500 are generally configured for deactivating the communication enable circuit 250, charging a battery of the client device 201 with power delivered from the two-wire cable 10 while the voltage of the two-wire cable 10 is detected as active, and transitioning to the first state 510 when the voltage of the two-wire cable 10 is detected as inactive.

In the fifth state 550, STATE 5 (DEAD BATTERY), the client control circuit 220 ceases communications with the host device 101, since the battery voltage is below a critical level for proper operation (e.g., VBAT<VSD). In a particular example, all communication circuits (e.g., communication enable circuit 250, transmitter circuit 260, receiver circuit 270, etc.) may be disabled or deactivated, each by adjusting their respective control signals (e.g., C_EN2=OFF, etc.). The battery test circuit 240 continues to remain active, and the charger circuit 203 is activated in an attempt to charge the battery to an acceptable level. Once the communication enable circuit 250 is deactivated or disabled, the host device 101 can detect this dead battery state by evaluating the voltages associated with the terminal 11 and two-wire cable, and thus may adjust the charging currents accordingly. Also, in the fifth state, the client control circuit 220 continues to monitor the battery voltage VBAT and the voltage VPIN of the terminal 11. The state machine 500 transitions from the fifth state 550 to a sixth state (560) when the voltage VPIN of the two-wire cable is applied. Otherwise, the state machine 500 remains in the fifth state 550. In other words, in the fifth state 550, the client device 201 and state machine 500 are generally configured for deactivating the communication enable circuit, and transitioning from the fifth state 550 to a sixth state 560 when the voltage VPIN of the two-wire cable 10 is applied 556.

In the sixth state 560, STATE 6 (RECOVERY), the client device 201 operates the charger circuit 202 to attempts to charge the battery to an acceptable level for proper operation. The battery test circuit 240 continues to remain active, and the charger circuit 203 is activated in an attempt to charge the battery to an acceptable level. The current level in this state may be controlled by the host device 101 to ensure a safe charge level is applied (e.g., a minimum charge level). Also, the client communication circuits remain inactive, and the client control circuit continues to monitor the battery voltage VBAT and the voltage VPIN of the two-wire cable 10. In this state, if the battery voltage VBAT remains below the critical level for operation (VBAT<VSD) and the voltage VPIN of the two-wire cable 10 is removed, then the state machine 500 transitions to the fifth state 550. However, if the battery voltage recovers enough charge to an acceptable level (VBAT>VSD), then the state machine 500 transitions from the sixth 560 state back to the first state 510. In other words, in the sixth state 560, the client device 201 and state machine 500 are generally configured for charging the battery at a safe charge level; transitioning to the fifth state 550 when the voltage VPIN of the two-wire cable 10 is removed and the battery voltage VBAT is detected 565 below the shut-down threshold voltage VSD; and transitioning to the first state 510 when the voltage VPIN of the two-wire cable 10 is removed and the battery voltage VBAT is detected 561 above the shut-down threshold voltage VSD.

FIG. 6 shows graphs 600 and 610 illustrating example timings for an example power delivery and communication system, in accordance with the present disclosure.

The first graph 600 illustrates negotiated communications 601 and charger currents 602 aligned in time. At an initial time (e.g., 0 s), the client and host devices are initially in a charging state with a two-wire cable 10 attached and current flows with an amplitude of about 800 mA. In this state, communications between the devices are disabled as shown. At a subsequent time (e.g., 0.18 s), the cable is detached from the devices, interrupting current flow as shown by the drop to 0A, and the voltage on the pin begins to increase to a higher voltage level (e.g., about 2.8V). After the voltage increase is detected (e.g., about 0.2 s), the host device 101 and the client device are both in an initial state of detached (310, 510), where charging is disabled or 0A. When the client device again attaches to the cable (e.g., about 0.3 s) the host device recognizes the drop in voltage and detects the device attachment. Subsequently (e.g., from about 0.35 s to about 0.45 s) the host and client devices begin a negotiated data transmission over the cable 10, all while charging remains disabled. During a transmit portion of the data communication period, the host device 101 establishes the initial connection with the client device (e.g., the first message), and over a receive portion of the data communication period, the client device 201 responds with an acknowledgement to the host device (e.g., the second message). The host device 101 processes the acknowledgement message, recognizes the message as a successful negotiation, and enables the charger current to begin flowing to the client device 101 at a later time (e.g., about 0.7 s), wherein the charger current is set to a level of about 1.5 A. After charging is complete or the cable is detected as detached (e.g., about 0.85 s), the host and client devices returns to their default states.

The second graph 610 is aligned in time with the first graph 600, to show communication of encoded data from the host device to the client device. The illustrated commutation uses Bi-phase Marked Encoding (BMC), as an example. BMC is a method of encoding the clock and data lines into a single communication line, similar to Manchester encoding. For BMC, transitions occur on every positive clock edge. BMC also transitions on the negative clock edge when the data is a Logic "1". BMC can easily be encoded/decoded utilizing a microcontroller.

Graph 610 illustrates three signals that provide an 8-bit packet for an encoded message. A data message 612 is shown in the same time scale as a clock signal 611. An example 8-bit packet of data is shown with bits times illustrated by the clock signal 611, where the data bits for encoding are given as: 0 0 1 0 1 1 1 0. The encoded data is illustrated as signal 613. For bit 0, which has a value of 0, the data is encoded high (logic 1) for the positive clock edge and remains high until the next bit time. For bit 1, which also has a value of 0, the data being encoded as low (logic 0) for the positive clock edge results and remains low until the next bit time. For bit 2, which also has a value of 1, the data is encoded as high (logic 1) for the positive clock edge, but also transitions low on the negative clock edge as shown. Thus, every rising edge requires a bit transition, but falling edges only transition for logic values of 1. The process continues for the remain bits as illustrated.

For Manchester encoding (not shown), the encoding of each bit is either low then high, or high then low, and of equal time per bit. A logic "1" may be represented by a rising edge, while a logic "0" may represented by a failing edge. It has no DC component, and is self-clocking.

Other encoding schemes are also contemplated and considered within the scope of disclosure.

Each negotiated transmission between the host and client devices may consist of several parts. First, the host device 101 sends a start bit, to provide an edge for the client to latch onto (or sync to) once detection has completed. The start bit may be implemented as an electrically low/logic high signal. The host device 101 may then send a packet of data in encoded format, such as BMC, where the packet length is a set amount of data bits as may be required for the unique number of messages selected for the protocol (e.g., 4-bit, 8-bit, etc.). Finally, the host device may send an error correction code, such as a 4-bit CRC code.

The client device responds to the host message (e.g., the first message) with a reply message (e.g., the second message) of the same format as the host message. Thus, the client device may also be configured to send a start bit to provide an edge for the host device to latch onto (sync to), and then the client transmits the encoded packet of data (e.g., 4-bit, 8-bit, etc.), followed by an error correction code, such as a 4-bit CRC code.

The contents of the host message packet may include a number of desired encoded data elements such as input current levels available (e.g., 0=25 mA, 01=50 mA, 10=100 mA, etc.), case status of the device, etc. The contents of the client message packet may similarly include a number of desired encoded data elements such as status of the device (e.g., 00=OFF, 01=Standby, 10=ON, etc.), status of the battery (e.g., 01=low charge, 11=fully charged, etc.), and an acknowledgment message that may be set to a value of 1 to indicate a matched CRC code was received in the host message.

The above examples messages are merely examples, and other message structures are contemplated within the scope of this disclosure.

FIG. 7 shows a detailed schematic diagram 700 of host support circuits in an example power delivery and communication system, arranged in accordance with various aspects of the present disclosure. The schematic includes example circuits for a charge sense circuit 130, an attachment test circuit 140, a communication enable circuit 150, a transmitter circuit 160 and a receiver circuit 170. Like elements and nodes from FIG. 1 are labelled identically.

The example charge sense circuit 130 includes a sense resistor (RSNS) coupled between the switched power node N1S and the second node N2, and a sense amplifier with inputs coupled across the switched power node N1S and the second node N2. The sense resistor is thus configured as a resistance that is in a series path of the charger circuits (e.g., the load switch circuit 104) of the host device 101 and a terminal or pin 11 that connects to the two-cable wire 10. Thus, in operation, the output of the sense amplifier will provide an indication of the amount of current flowing in the sense resistor as a sense signal (I_SNS) at node N12. The value of the sense resistor is a low value (e.g., 5 mOhms).

The example attachment test circuit 140 is configured to couple a first resistance RPU1 to the switched power node N1S responsive the detection enable signal DET_EN. The specific illustrated implementation employs a pull-up scheme, where the first resistor is coupled between node N3 and a drain of a transistor Q1, where the source of transistor Q1 is coupled to node N1S. Resistors R21 and R22 control bias and switch timing to the gate of transistor Q2, which is responsive to the detection enable signal DET_EN. The drain of transistor Q2 controls the activation of the gate of transistor Q1, where resistors R11 and R12 control it's bias and switch timing of transistor Q1. In other implementations, this circuit may be implemented as a pull-down circuit. The value of the first pullup resistance in this example is 100 k Ohms.

The example communication enable circuit 150 is configured to couple a second resistance (RPU2) to the switched power node N1S responsive the communication enable signal C_EN1. The specific illustrated implementation employs a pull-up scheme, which is substantially the same as the attachment test circuit 140. The value of the second pullup resistance in this example is 100 k Ohms.

The example transmitter circuit 160 includes a pulldown resistor RTX1 that includes a first side that is coupled to the switched power node N1S, and a second side that is selectively coupled through a transistor circuit to a circuit ground GND1 responsive to the data transmit signal D_TX1. The transistor circuit includes a transistor Q5 with a drain coupled to the second side of the pulldown resistor RTX1, a source coupled to the circuit ground GND1, and a gate that is biased by resistors R51 and R52 responsive to the data transmit signal D_TX1. The transmitter circuit 160 cooperatively operates with the other resistance values that are coupled to node N1S, such as RPU2 in the transmitter enable circuit 150. For example, when the data transmit signal D_TX1 has a low value, RPU2 pulls the node N1S up to a higher voltage (VR1), and when the data transmit signal D_TX1 has a high value, RTX1 is pulled down to a lower voltage (e.g., GND1). In other implementations, the transmitter circuit 160 circuit may be implemented as a pull-up circuit that cooperates with a pull-down version of the communication enable circuit. The value of the first pull-down resistance in this example is 20 Ohms.

The example receiver circuit 170 includes a differential amplifier that compares a voltage (VPIN) at the terminal of node N2 to a reference level to generate a data receive signal (D_RX1) at node N16. For the detailed example, the receiver circuit 170 also includes a first voltage divider and a second voltage divider. The first voltage divider, which is illustrated by resistors RD1 and RD2, is coupled between the reference voltage VR1 at the third node N3 and the circuit ground GND1 to provide the reference level. The second voltage divider, which is illustrated by resistors RD3 and RD4, is coupled between the second node N2 and the circuit ground GND1 to provide a data signal. The differential amplifier compares the reference level to the data signal to generate the data receive signal D_RX1. The value of resistors RD1 and RD2 in this example are 140K and 10K, respectively, providing a voltage division with a reference level of VR1/15. The value of resistors RD3 and RD4 in this example are 175K and 25K, respectively, providing a voltage division with a data signal of VPIN/8.

FIG. 8 shows a detailed schematic diagram 800 of client support circuits in another example power delivery and communication system, arranged in accordance with some aspects of the present disclosure. The schematic includes example circuits for a battery test circuit 240, a communication enable circuit 250, a transmitter circuit 260 and a receiver circuit 270. Like elements and nodes from FIG. 2 are labelled identically.

The battery test circuit 240 is illustrated as a pulldown resistor RPD2 that is coupled between the terminal N20 and a circuit ground GND2. In other examples, this pulldown resistor may be replaced with a pullup resistor that is referenced to another voltage (e.g., VR2). The value of this example resistor RPD2 is 200K Ohms. The pulldown resistor RPD2 cooperatively enables various functions and detection for the host device.

The transmitter circuit 260 of FIG. 8 is substantially matched to the transmitter circuit 160 from FIG. 7, and operates in the same manner, but responsive to the data transmit signal D_TX2 from node N25.

The communication enable circuit 250 and the receiver circuit 270 functions are illustrated as linked together, although in other examples they may be implemented separately. The communication enable circuit 240 includes a pulldown resistor (RD12, RD13) that includes a first side that is coupled to the terminal at node N20, a second side that is selectively coupled to the circuit ground GND2 through a transistor circuit that is responsive to the communication enable signal C_EN2. The pulldown resistor has a value that corresponds to the series combination of resistors RD12 and RD13, where RD13 is coupled between node N20 and resistor RD12. The transistor circuit includes a transistor Q4 with a drain coupled to the other side of resistor RD12, a source coupled to the circuit ground GND2, and a gate that is biased by resistors R41 and R42 responsive to the communication enable signal C_EN2 at node N24. The value of the pulldown resistance in this example is 200 k Ohms. The communication enable circuit 160 cooperatively operates with the other resistance values that are coupled to node N20. For example, C_EN2 is active, the 200 k Ohms from the battery test circuit 240 is in parallel with the 200 k Ohms of the communication enable circuit, yielding an effective resistance of 100 k Ohms.

The receiver circuit 270 in FIG. 8 is substantially matched to the receiver circuit 170 in FIG. 7, which the addition of the transistor circuit to switch the voltage divider formed by resistors RD13 and RD12. The first voltage divider, formed by resistors RD13 and RD12, is coupled between a reference voltage VR2 at node N31 and a circuit ground GND2 to provide a reference level, while the second voltage divider, formed by resistors RD3 and RD4, is coupled between the terminal at N20 and the circuit ground GND2 through transistor Q4, when the communication enable signal C_EN2 is asserted. The differential amplifier compares the reference level to the data signal to generate the data receive signal D_RX2 at node N26.

As illustrated by the circuits of FIGS. 7 and 8, the operation of the various detection modes may be facilitated as described previously. The values of the various resistors in the pull-up and pull-down configuration determine the detection levels required. For example, the host device 101 operated with the client device 201 presents the following pull-up and pull-down resistances to node N2, ignoring RSNS so N1S=N2, based on the various conditions:

TABLE 3

| DET_EN | C_EN1 | C_EN2 | VBAT | Host Pullup | Host Pulldown | Client Pulldown | VPIN |
|---|---|---|---|---|---|---|---|
| OFF | OFF | OFF | DEAD | NA | 200 kΩ | 200 kΩ | 0 V |
| ON | OFF | OFF | DEAD | 100 kΩ | 200 kΩ | 200 kΩ | 0.5*VR1 |
| ON | OFF | ON | OK | 100 kΩ | 200 kΩ | 100 kΩ | 0.4*VR1 |
| OFF | ON | ON | OK | 100 kΩ | 200 kΩ | 100 kΩ | 0.4*VR1 |

The disclosure presented herein also encompasses the subject matter set forth in the following clauses:

Example Clause A: A method for a host device (101) to communicate with a client device (201) over a powerline with a two-wire cable (10), the method for the host device (101) comprising: initializing the host device (101) to operate in a first state (310); in a first state (310), disabling host device charging and communication circuits, operating a first timer (311), and transitioning to a second state (320) after the first timer expires (312); in the second state (320), operating a second timer while monitoring a status of the two-wire cable (10), transitioning to a third state (330) when the second timer has not expired and a status of the two-wire cable (10) is detected as attached (323), and transitioning to the first state (310) when the second timer has expired (321); in the third state (330), enabling host device communication circuits to send (333) a first message to the two-wire cable (10), and transitioning to a fourth state (340) after the transmission of the first message is complete (334); in the fourth state (340), enabling host device communication circuits to receive (344) a second message from the two-wire cable (10), transitioning to a fifth state (350) when the second message received indicates success (345), and transitioning to the first state (310) when the second message received indicates failure (341); an in a fifth state (350), enabling host device charging circuits to couple power to the two-wire cable (10) while monitoring the status of the two-wire cable (10), and transitioning to the first state (310) when either charging is complete or the status of the two-wire cable (10) is detached.

Example Clause B: The method of any of the preceding clauses, further comprising: in the fifth state (350), operating a third timer while enabling host device charging circuits to couple power to the two-wire cable (10), transitioning to a sixth state (360) when the third timer expires (356); and in the sixth state (360), operating a fourth timer while monitoring the status of the two-wire cable (10), transitioning to the third state (330) when the fourth timer has not expired and the status of the two-wire cable (10) is detected as attached (365), and transitioning to the first state (310) when the fourth timer has expired.

Example Clause C: The method of any of the preceding clauses wherein monitoring the status of the two-wire cable (10) further comprises: coupling an attachment test circuit (140) to a terminal (11) of the two-wire cable (10); and evaluating a voltage (VPIN) associated with the terminal (11) of the two-wire cable (10) when the attachment test circuit (140) is active.

Example Clause D: The method of any of the preceding clauses wherein coupling the attachment test circuit (140) to the terminal (11) of the two-wire cable (10) includes:

coupling a pullup resistor from a first reference voltage (VR1) to a terminal (11) of the two-wire cable (10); and wherein the voltage (VPIN) associated with the terminal (11) of the two-wire cable varies based on the pullup resistor of the host device (101) and one or more corresponding pull-down resistors associated with the client device (201).

Example Clause E: The method of any of the preceding clauses, wherein monitoring the status of the two-wire cable (10) includes: evaluating a voltage (VPIN) associated with the two-wire cable (10), and determining the status of the two-wire cable (10) as attached when the voltage associated with the two-wire cable (10) exceeds a first reference value.

Example Clause F: The method of any of the preceding clauses, wherein monitoring the status of the two-wire cable (10) includes: evaluating a voltage (VPIN) associated with the two-wire cable (10), and determining the status of the two-wire cable (10) as dead battery when the voltage associated with the two-wire cable (10) is in a range between a first reference value and a second reference value.

Example Clause G: The method of any of the preceding clauses, further comprising: transitioning from the second state (320) to a seventh state (370) when the second timer has not expired and the status of the two-wire cable (10) is determined as the dead battery; and in the seventh state, operating a fifth timer and enabling host device charging circuits to couple power to the two-wire cable (10) at a reduced charge level, and transitioning to the first state (310) after the fifth timer expires (371).

Example Clause H: The method of any of the preceding clauses, wherein monitoring the status of the two-wire cable (10) includes: evaluating a voltage (VPIN) associated with the two-wire cable (10), and determining the status of the two-wire cable (10) as short circuit when the voltage associated with the two-wire cable (10) is in a range between a second reference value and a third reference value.

Example Clause I: The method of any of the preceding clauses, further comprising: transitioning from the second state (320) to an eighth state (380) when the second timer has not expired and the status of the two-wire cable (10) is determined as the short circuit; and in the eighth state, operating a sixth timer and disabling host device charging and communication circuits, and transitioning to the first state (310) after the sixth timer expires (381).

Example Clause J: The method of any of the preceding clauses, wherein monitoring the status of the two-wire cable (10) includes: evaluating a voltage (VPIN) associated with the two-wire cable (10); determining the status of the two-wire cable (10) as attached when the voltage associated with the two-wire cable (10) exceeds a first reference value; determining the status of the two-wire cable (10) as dead battery when the voltage associated with the two-wire cable (10) is in a first range between the first reference value and a second reference value; and determining the status of the two-wire cable (10) as short circuit when the voltage associated with the two-wire cable (10) is in a second range between the second reference value and a third reference value.

Example Clause K: The method of any of the preceding clauses, wherein enabling host device communication circuits to send (333) the first message to the two-wire cable (10) comprises encoding the first message with a Biphase Mark Code (BMC), and modulating a signal associated with the two-wire cable (10) with the BMC encoded first message.

Example Clause L: The method of any of the preceding clause, wherein enabling host device (101) communication circuits to send (333) the first message to the two-wire cable (10) comprises: before a transmit period commences, coupling a pullup resistor from a first reference voltage (VR1) to a terminal (11) of the two-wire cable (10); during the transmit period, selectively coupling a pulldown resistor from the terminal (11) of the two-wire cable (10) to the ground reference (GND1) responsive to data bit values of a packet for the first message to modulate the transmission by selective operation of the pulldown resistor; and after the transmit period ends, decoupling the pulldown resistor from the terminal (11) of the two-wire cable (10).

Example Clause M: The method of any of the preceding clauses, wherein enabling host device communication circuits to receive (344) the second message from the two-wire cable (10) comprises: before a receive period commences, coupling a pullup resistor from a first reference voltage (VR1) to a terminal (11) of the two-wire cable (10), wherein the pullup resistor is configured to cooperatively modulate data transmitted by the client device (201) during the receive period; during the receive period, comparing a signal associated with the terminal (11) of the two-wire cable (10) to a reference value to generate received data; and after the receive period ends, decoupling the pullup resistor from the terminal (11) of the two-wire cable (10).

Example Clause N: A host device (101) configured to communicate with a client device (201) to negotiate charging from an external power source over a two-wire cable (10), the host device (101) comprising: a load switch circuit (104) that selectively couples power from a power source at a first node (N1) to a switched power node (N1S) responsive to a power enable signal (PWR_EN); host support circuits (110), including: a charge sense circuit (130) that is coupled between the switched power node (N1S) and a second node (N2), wherein the second node (N2) corresponds to a terminal (PIN1) of the two-wire cable (10); an attachment test circuit (140) that selectively couples a first resistance (RPU1) to the switched power node (N1S) responsive a detection enable signal (DET_EN); a communication enable circuit (150) that selectively couples a second resistance (RPU2) to the switched power node (N1S) responsive a communication enable signal (C_EN1); a transmitter circuit (160) that selectively couples modulated data to the switched power node (N1S) responsive a data transmit signal (D_TX1); a receiver circuit (170) that selectively receives modulated data from the second node (N2) to generate a data receive signal (D_RX1); and a host control circuit (120) that is configured to selectively operate the load switch circuit (104) and the host support circuits (110) to negotiate detection, attachment, communications, and charging of the client device with time-domain separated bi-directional communications.

Example Clause O: The device of Clause N, the charge sense circuit (130) comprising: a sense resistor (RSNS) coupled between the switched power node (N1S) and the second node (N2), and a sense amplifier with inputs coupled across the switched power node (N1S) and the second node (N2).

Example Clause P: The device of any of Clauses N through O, the attachment test circuit (140) comprising a pullup resistor that includes a first side that is coupled to a reference voltage (VR1) at a third node (N3), wherein a second side of the pullup resistor is selectively coupled to the switched power node (N1) through a transistor circuit that is responsive to the detection enable signal (DET_EN).

Example Clause Q: The device of any of Clauses N through P, the communication enable circuit (140) comprising a pullup resistor that includes a first side that is coupled to a reference voltage (VR1) at a third node (N3), wherein a second side of the pullup resistor is selectively coupled to the switched power node (N1) through a transistor circuit that is responsive to the communication enable signal (C_EN1).

Example Clause R: The device of any of Clauses N through Q, the transmitter circuit (160) comprising that a pulldown resistor (RTX1) that includes a first side that is coupled to switched power node (NIS), wherein a second side of the pulldown resistor (RTX1) is selectively coupled through a transistor circuit to a circuit ground (GND1) responsive to the data transmit signal (D_TX1).

Example Clause S: The device of any of Clauses N through R, the receiver circuit (170) comprising a first voltage divider, a second voltage divider, and a differential amplifier, wherein the first voltage divider is coupled between a reference voltage (VR1) at a third node (N3) and a circuit ground (GND1) to provide a reference level, the second voltage divider is coupled between the second node (N2) and the circuit ground (GND1) to provide a data signal, and wherein the differential amplifier compares the reference level to the data signal to generate a data receive signal (D_RX1).

Example Clause T: The device of any of Clauses N through S, the host control circuit (120) comprising a micro-controller unit that includes a state machine logic, memory, and an analog-to-digital converter.

Example Clause U: The device of any of Clauses N through T, wherein the host control circuit (120) includes a state machine configured to operate in one of a detached state, a detect state, a TX state, an RX state, and a charge state, wherein: in a detached state, the power enable signal (PWR_EN) is de-asserted, the detection enable signal (DET_EN) is de-asserted, the communication enable signal (C_EN1) is de-asserted, and the host control circuit (120) transition to the detect state after a first timer expires; in the detect state, the detection enable signal (DET_EN) is asserted, the host control circuit (120) transitions to the TX state when attachment is detected from a voltage (VPIN) of a terminal (PIN1) of the two-wire cable (10), and the host control circuit (120) transitions back to the detached state when attachment is not detected before a second timer expires; in the TX state, the data transmit signal (D_TX1) is modulated with a first data transmission during a transmit period while the communication enable signal (C_EN1) is asserted, and the host control circuit (120) transitions to the RX state after transmission is complete; and in the RX state, a second data transmission is received from the data receive signal (D_RX1) during a receive period while the communication enable signal (C_EN1) is asserted, the host control circuit (120) transitions to a charge state when a successful second data transmission is received, and the host control circuit (120) transitions to the detached state when an unsuccessful second data transmission is received.

Example Clause V: A method for a client device (201) to communicate with a host device (101) over a powerline with a two-wire cable (10), the method for the client device (201) comprising: coupling a battery test circuit (240) to a terminal (11) of the two-wire cable (10); initializing the client device (201) to operate in a first state (510); in the first state (510), activating a communication enable circuit (250) and monitoring a voltage of the two-wire cable (10), transitioning to a second state (520) when the voltage of the two-wire cable (10) is detected as active (512); in the second state (520), enabling client device communication circuits to receive (522) a first message from the two-wire cable (10), transitioning to a third state (350) after the first message is received (523); in the third state (530), enabling client device communication circuits to transmit (533) a second message to the two-wire cable (10), transitioning to a fourth state (540) when the second message is transmitted and the voltage of the two-wire cable (10) is detected as active (534), and transitioning to the first state (510) when the voltage of the two-wire cable (10) is detected as inactive (541); and in the fourth state (540), deactivating the communication enable circuit (250), charging a battery of the client device (201) with power delivered from the two-wire cable (10) while the voltage of the two-wire cable (10) is detected as active, and transitioning to the first state (510) when the voltage of the two-wire cable (10) is detected as inactive (541).

Example Clause W: The method of clause V, further comprising: transitioning from the first state (510) to a fifth state (550) when a battery voltage (VBAT) of the client device (201) is detected (515) below a shut-down threshold voltage (VSD); and deactivating the communication enable circuit (250) in the fifth state (550).

Example Clause X: The method of any of clauses V through W, further comprising: transitioning from the fifth state (550) to a sixth state (560) when the voltage (VPIN) of the two-wire cable (10) is applied (556); charging the battery in the sixth state (550) at a safe charge level; transitioning from the sixth state (560) to the fifth state (550) when the voltage (VPIN) of the two-wire cable (10) is removed and the battery voltage (VBAT) is detected (565) below the shut-down threshold voltage (VSD); and transitioning from the sixth state (560) to the first state (510) when the voltage (VPIN) of the two-wire cable (10) is removed and the battery voltage (VBAT) is detected (561) above the shut-down threshold voltage (VSD).

Example Clause AA: A client device (201) that negotiates charging of a battery (202) of the client device from a host device with an external power source over a two-wire cable (10), the client device (101) comprising: a charger circuit (203) that is coupled between a battery and a terminal for the two-wire cable (10); and client support circuits (210), including: a battery test circuit (240) that couples a first resistance (RPD2) to the terminal (11); a communication enable circuit (250) that selectively couples a second resistance (RD12, RD13) to the terminal (11) responsive a communication enable signal (C_EN2); a transmitter circuit (260) that selectively couples modulated signals to the terminal (11) responsive a data transmit signal (D_TX2); a receiver circuit (270) that selectively receives modulated signals from the terminal (11) to generate a data receive signal (D_RX2); and a client control circuit (220) that is configured to selectively operate the charger circuit and the client support circuits (210) to negotiate attachment, communications, and charging of the battery (202) of the client device with time-domain separation between communications and charging.

Example Clause BB: The client device of Clause AA, the battery test circuit (240) comprising a pulldown resistor that is coupled between the terminal (11) and a circuit ground (GND2).

Example Clause CC: The client device of any of Clauses AA through BB, the communication enable circuit (240) comprising a pulldown resistor (RD12, RD13) that includes a first side that is coupled to the terminal (11), wherein a second side of the pulldown resistor is selectively coupled to the circuit ground (GND2) through a transistor circuit that is responsive to the communication enable signal (C_EN2).

Example Clause DD: The client device of any of Clauses AA through CC, the transmitter circuit (260) comprising that a pulldown resistor (RTX2) that includes a first side that is coupled to the terminal (11), wherein a second side of the pulldown resistor (RTX2) is selectively coupled through a transistor circuit to a circuit ground (GND2) responsive to the data transmit signal (D_TX2).

Example Clause EE: The client device of any of Clauses AA through DD, the receiver circuit (270) comprising a first voltage divider, a second voltage divider, and a differential amplifier, wherein the first voltage divider is coupled between a reference voltage (VR2) at a node (N31) and a circuit ground (GND2) to provide a reference level, the second voltage divider is coupled between the terminal (11) and the circuit ground (GND2), when the communication enable signal (C_EN2) is asserted, to provide a data signal, and wherein the differential amplifier compares the reference level to the data signal to generate a data receive signal (D_RX2).

Example Clause FF: The client device of any of Clauses AA through EE, the communication enable circuit (240) comprising a pulldown resistor that includes a first side that is coupled to the terminal (11), wherein a second side of the pulldown resistor is selectively coupled to the circuit ground (GND2) through a transistor circuit that is responsive to the communication enable signal (C_EN2), wherein the pulldown resistor corresponds to the second voltage divider.

Example Clause GG: The client device of any of Clauses AA through FF, the client control circuit (220) comprising a micro-controller unit that includes a state machine logic, memory, and an analog-to-digital converter.

Example Clause HH: The client device of any of Clauses AA through GG, wherein the client control circuit (220) includes a state machine configured to operate in one of a detached state, an RX state, a TX state, and a charge state, wherein: in the detached state, the communication enable signal (C_EN2) is asserted, and the client control circuit (220) transition to the RX state after a voltage (VPIN) of the terminal (11) is detected as active; in the RX state, a first data transmission is received from the data receive signal (D_RX2) during a receive period while the communication enable signal (C_EN2) is asserted, and the client control circuit (220) transitions to the TX state when receipt of the first data transmission is complete; and in the TX state, the data transmit signal (D_TX1) is modulated with a second data transmission during a transmit period while the communication enable signal (C_EN2) is asserted, the client control circuit (220) transitions to the charge state after the transmission period ends when the voltage (VPIN) of the terminal (N20) is detected active, the client control circuit (220) transitions to the detached state after the transmission period ends when the voltage (VPIN) of the terminal (N20) is detected inactive.

It will be understood that the configurations and/or approaches described herein are examples, and that these specific embodiments or examples are not to be considered in a limiting sense, because numerous variations are possible. As such, various system, circuits, and/or devices may be broken into additional functions or circuits, and/or combined with other functions or circuits as may be desirable in a specific implementation. Similarly, the specific routines, procedures or methods described herein may represent one or more of any number of processing strategies. As such, various acts illustrated and/or described may be performed in the sequence illustrated and/or described, in other sequences, in parallel, or omitted. Likewise, the order of the above-described processes or methods may be changed. The subject matter thus includes all novel and non-obvious combinations and sub-combinations of the methods, processes, circuits, devices, systems and configurations, and other features, functions and/or properties disclosed herein, as well as any and all equivalents thereof.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for a host device to communicate with a client device over a powerline with a two-wire cable, the method for the host device comprising:
    initializing the host device to operate in a first state;
    in a first state, disabling host device charging and communication circuits, operating a first timer, and transitioning to a second state after the first timer expires;
    in the second state, operating a second timer while monitoring a status of the two-wire cable, transitioning to a third state when the second timer has not expired and a status of the two-wire cable is detected as attached, and transitioning to the first state when the second timer has expired;
    in the third state, enabling host device communication circuits to send a first message to the two-wire cable, and transitioning to a fourth state after the transmission of the first message is complete;
    in the fourth state, enabling host device communication circuits to receive a second message from the two-wire cable, transitioning to a fifth state when the second message received indicates success, and transitioning to the first state when the second message received indicates failure; and
    in a fifth state, enabling host device charging circuits to couple power to the two-wire cable while monitoring the status of the two-wire cable, and transitioning to the first state when either charging is complete or the status of the two-wire cable is detached.

2. The method of claim 1, further comprising:
    in the fifth state, operating a third timer while enabling host device charging circuits to couple power to the two-wire cable, transitioning to a sixth state when the third timer expires; and
    in the sixth state, operating a fourth timer while monitoring the status of the two-wire cable, transitioning to the third state when the fourth timer has not expired and the status of the two-wire cable is detected as attached, and transitioning to the first state when the fourth timer has expired.

3. The method of claim 1, wherein monitoring the status of the two-wire cable further comprising:
    coupling an attachment test circuit to a terminal of the two-wire cable; and
    evaluating a voltage associated with the terminal of the two-wire cable when the attachment test circuit is active.

4. The method of claim 3, wherein coupling the attachment test circuit to the terminal of the two-wire cable includes:
    coupling a pullup resistor from a first reference voltage to a terminal of the two-wire cable; and
    wherein the voltage associated with the terminal of the two-wire cable varies based on the pullup resistor of the host device and one or more corresponding pull-down resistors associated with the client device.

5. The method of claim 1, wherein monitoring the status of the two-wire cable includes: evaluating a voltage associated with the two-wire cable, and determining the status of the two-wire cable as attached when the voltage associated with the two-wire cable exceeds a first reference value.

6. The method of claim 1, wherein monitoring the status of the two-wire cable includes: evaluating a voltage associated with the two-wire cable, and determining the status of the two-wire cable as dead battery when the voltage associated with the two-wire cable is in a range between a first reference value and a second reference value.

7. The method of claim 6, further comprising:
transitioning from the second state to a seventh state when the second timer has not expired and the status of the two-wire cable is determined as the dead battery; and
in the seventh state, operating a fifth timer and enabling host device charging circuits to couple power to the two-wire cable at a reduced charge level, and transitioning to the first state after the fifth timer expires.

8. The method of claim 1, wherein monitoring the status of the two-wire cable includes: evaluating a voltage associated with the two-wire cable, and determining the status of the two-wire cable as short circuit when the voltage associated with the two-wire cable is in a range between a second reference value and a third reference value.

9. The method of claim 8, further comprising:
transitioning from the second state to an eighth state when the second timer has not expired and the status of the two-wire cable is determined as the short circuit; and
in the eighth state, operating a sixth timer and disabling host device charging and communication circuits, and transitioning to the first state after the sixth timer expires.

10. The method of claim 1, wherein monitoring the status of the two-wire cable includes:
evaluating a voltage associated with the two-wire cable;
determining the status of the two-wire cable as attached when the voltage associated with the two-wire cable exceeds a first reference value;
determining the status of the two-wire cable as dead battery when the voltage associated with the two-wire cable is in a first range between the first reference value and a second reference value; and
determining the status of the two-wire cable as short circuit when the voltage associated with the two-wire cable is in a second range between the second reference value and a third reference value.

11. The method of claim 1, wherein enabling host device communication circuits to send the first message to the two-wire cable comprises encoding the first message with a Biphase Mark Code, and modulating a signal associated with the two-wire cable with the BMC encoded first message.

12. The method of claim 11, wherein enabling host device communication circuits to send the first message to the two-wire cable comprises:
before a transmit period commences, coupling a pullup resistor from a first reference voltage to a terminal of the two-wire cable;
during the transmit period, selectively coupling a pulldown resistor from the terminal of the two-wire cable to the ground reference responsive to data bit values of a packet for the first message to modulate the transmission by selective operation of the pulldown resistor; and
after the transmit period ends, decoupling the pulldown resistor from the terminal of the two-wire cable.

13. The method of claim 1, wherein enabling host device communication circuits to receive the second message from the two-wire cable comprises:
before a receive period commences, coupling a pullup resistor from a first reference voltage to a terminal of the two-wire cable, wherein the pullup resistor is configured to cooperatively modulate data transmitted by the client device during the receive period;
during the receive period, comparing a signal associated with the terminal of the two-wire cable to a reference value to generate received data; and
after the receive period ends, decoupling the pullup resistor from the terminal of the two-wire cable.

14. A host device configured to communicate with a client device to negotiate charging from an external power source over a two-wire cable, the host device comprising:
a load switch circuit that selectively couples power from a power source at a first node to a switched power node responsive to a power enable signal;
host support circuits, including:
a charge sense circuit that is coupled between the switched power node and a second node, wherein the second node corresponds to a terminal of the two-wire cable;
an attachment test circuit that selectively couples a first resistance to the switched power node responsive a detection enable signal;
a communication enable circuit that selectively couples a second resistance to the switched power node responsive a communication enable signal;
a transmitter circuit that selectively couples modulated data to the switched power node responsive a data transmit signal;
a receiver circuit that selectively receives modulated data from the second node to generate a data receive signal; and
a host control circuit that is configured to selectively operate the load switch circuit and the host support circuits to negotiate detection, attachment, communications, and charging of the client device with time-domain separated bi-directional communications.

15. The device of claim 14, the charge sense circuit comprising: a sense resistor coupled between the switched power node and the second node, and a sense amplifier with inputs coupled across the switched power node and the second node.

16. The device of claim 14, the attachment test circuit comprising a pullup resistor that includes a first side that is coupled to a reference voltage at a third node, wherein a second side of the pullup resistor is selectively coupled to the switched power node through a transistor circuit that is responsive to the detection enable signal.

17. A method for a client device to communicate with a host device over a powerline with a two-wire cable, the method for the client device comprising:
coupling a battery test circuit to a terminal of the two-wire cable;
initializing the client device to operate in a first state;
in the first state, activating a communication enable circuit and monitoring a voltage of the two-wire cable, transitioning to a second state when the voltage of the two-wire cable is detected as active;
in the second state, enabling client device communication circuits to receive a first message from the two-wire cable, transitioning to a third state after the first message is received;

in the third state, enabling client device communication circuits to transmit a second message to the two-wire cable, transitioning to a fourth state when the second message is transmitted and the voltage of the two-wire cable is detected as active, and transitioning to the first state when the voltage of the two-wire cable is detected as inactive; and in the fourth state, deactivating the communication enable circuit, charging a battery of the client device with power delivered from the two-wire cable while the voltage of the two-wire cable is detected as active, and transitioning to the first state when the voltage of the two-wire cable is detected as inactive.

18. The method of claim 17, further comprising:

transitioning from the first state to a fifth state when a battery voltage of the client device is detected below a shut-down threshold voltage; and deactivating the communication enable circuit in the fifth state.

19. The method of claim 17, further comprising:

transitioning from the fifth state to a sixth state when the voltage of the two-wire cable is applied;

charging the battery in the sixth state at a safe charge level;

transitioning from the sixth state to the fifth state when the voltage of the two-wire cable is removed and the battery voltage is detected below the shut-down threshold voltage; and transitioning from the sixth state to the first state when the voltage of the two-wire cable is removed and the battery voltage is detected above the shut-down threshold voltage.

20. A client device that negotiates charging of a battery of the client device from a host device with an external power source over a two-wire cable, the client device comprising:

a charger circuit that is coupled between a battery and a terminal for the two-wire cable; and client support circuits, including:

a battery test circuit that couples a first resistance to the terminal;

a communication enable circuit that selectively couples a second resistance to the terminal responsive a communication enable signal;

a transmitter circuit that selectively couples modulated signals to the terminal responsive a data transmit signal;

a receiver circuit that selectively receives modulated signals from the terminal to generate a data receive signal; and a client control circuit that is configured to selectively operate the charger circuit and the client support circuits to negotiate attachment, communications, and charging of the battery of the client device with time-domain separation between communications and charging.

* * * * *